H. L. JOHNSON.
WRAPPING MACHINE.
APPLICATION FILED JAN. 30, 1915.
1,270,416.
Patented June 25, 1918.
14 SHEETS—SHEET 3.
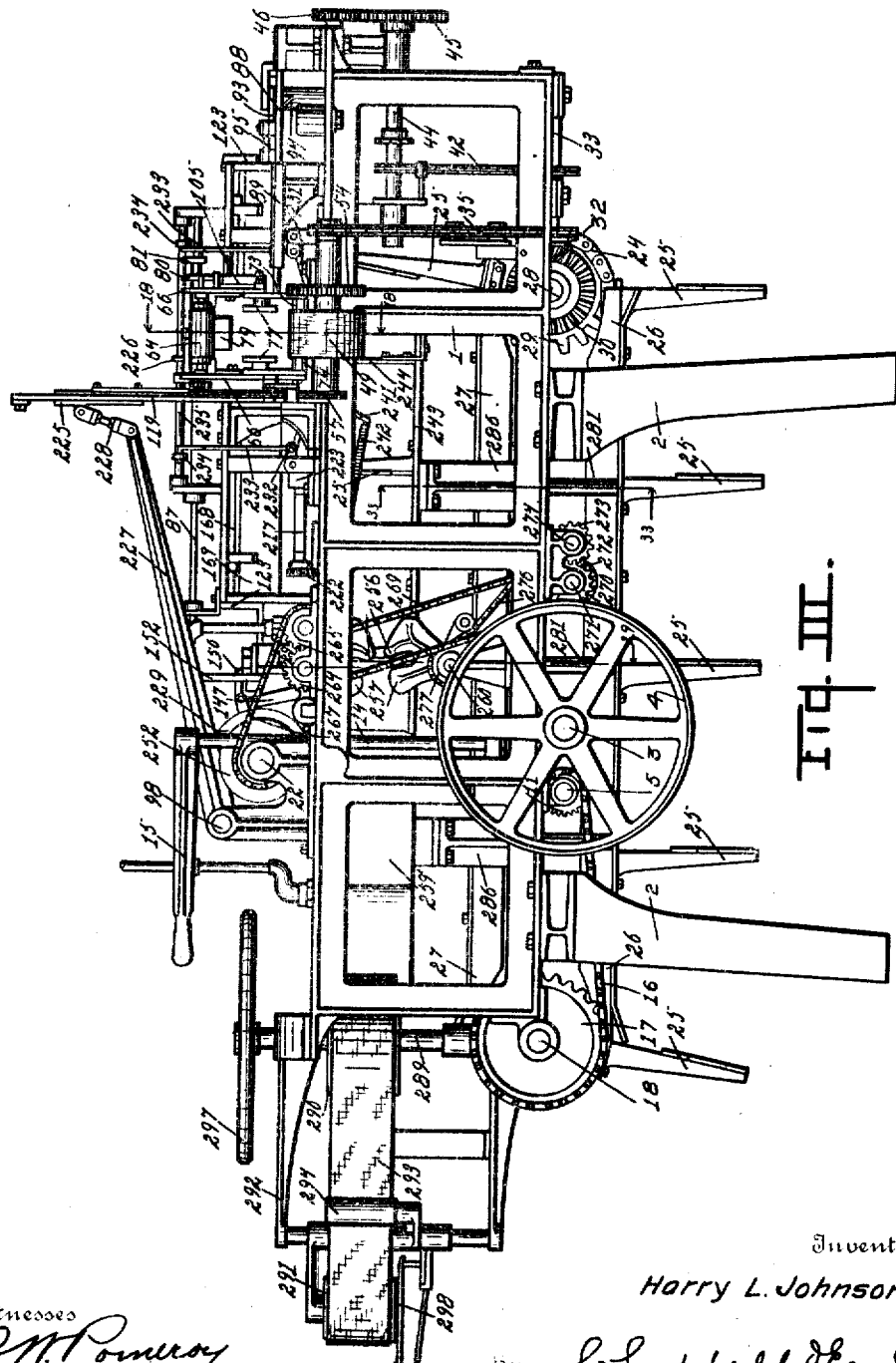
Fig. III.
Witnesses
P. W. Pomeroy
L. C. Blake
Inventor
Harry L. Johnson
by Chappell Hart
Attorneys

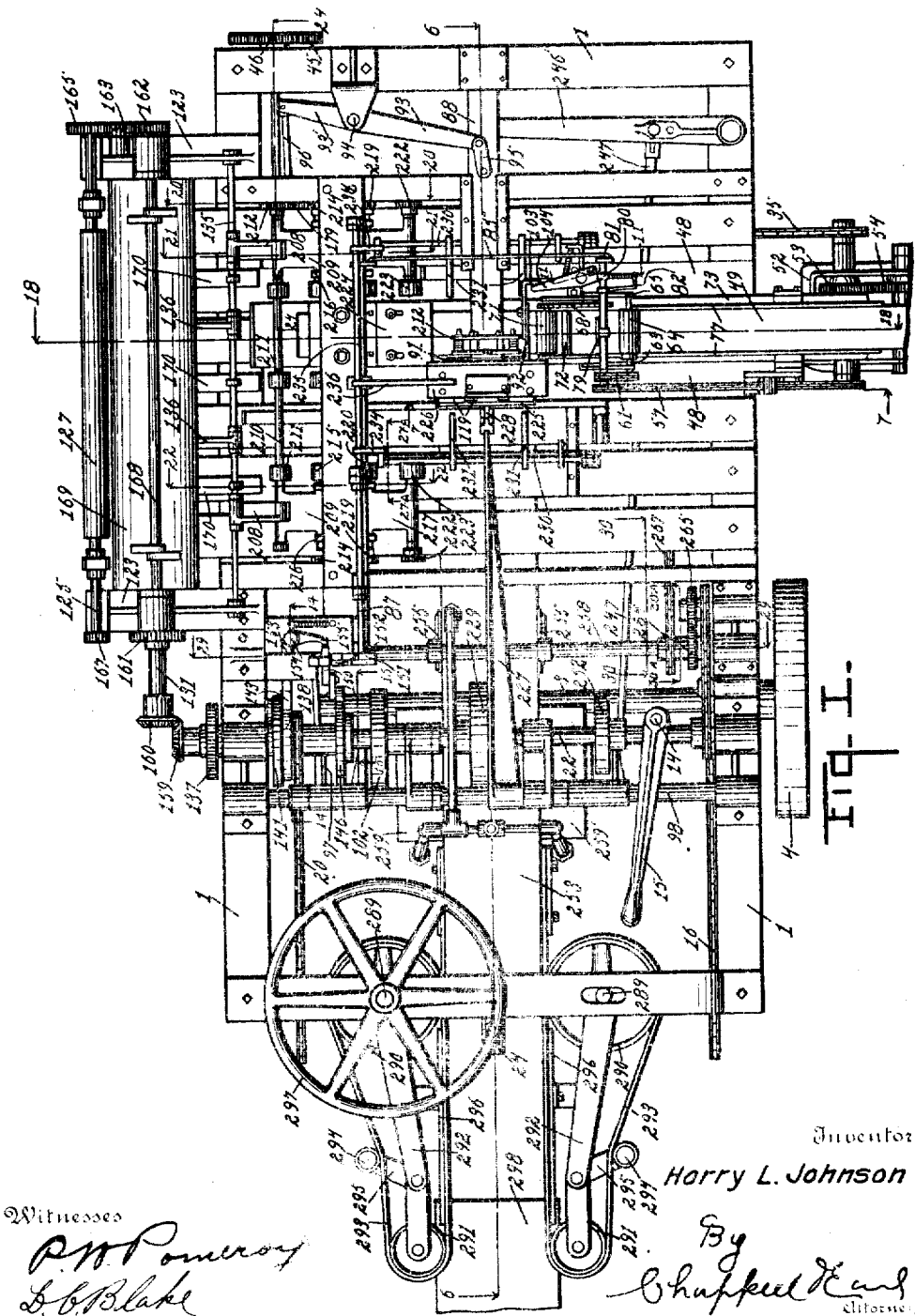

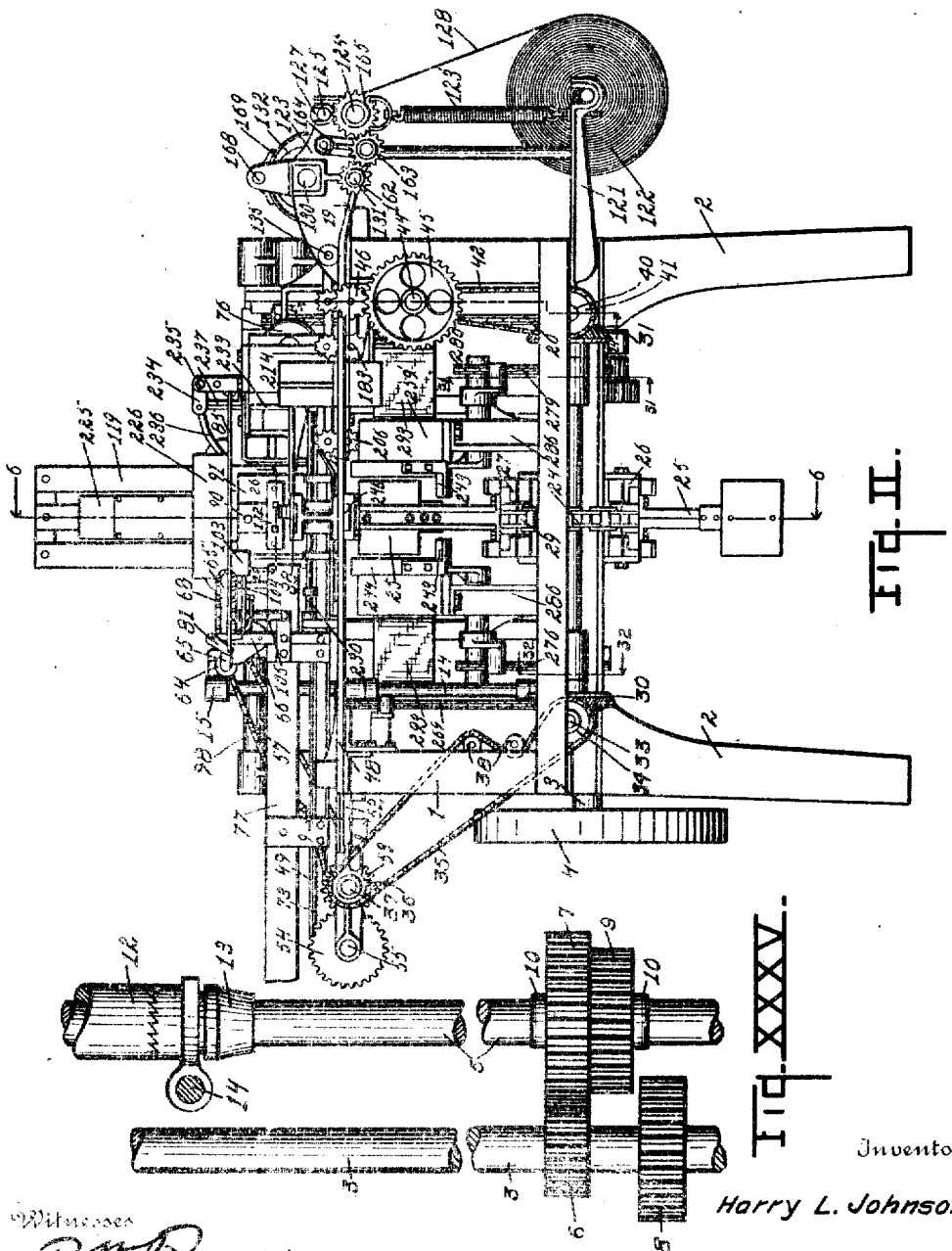

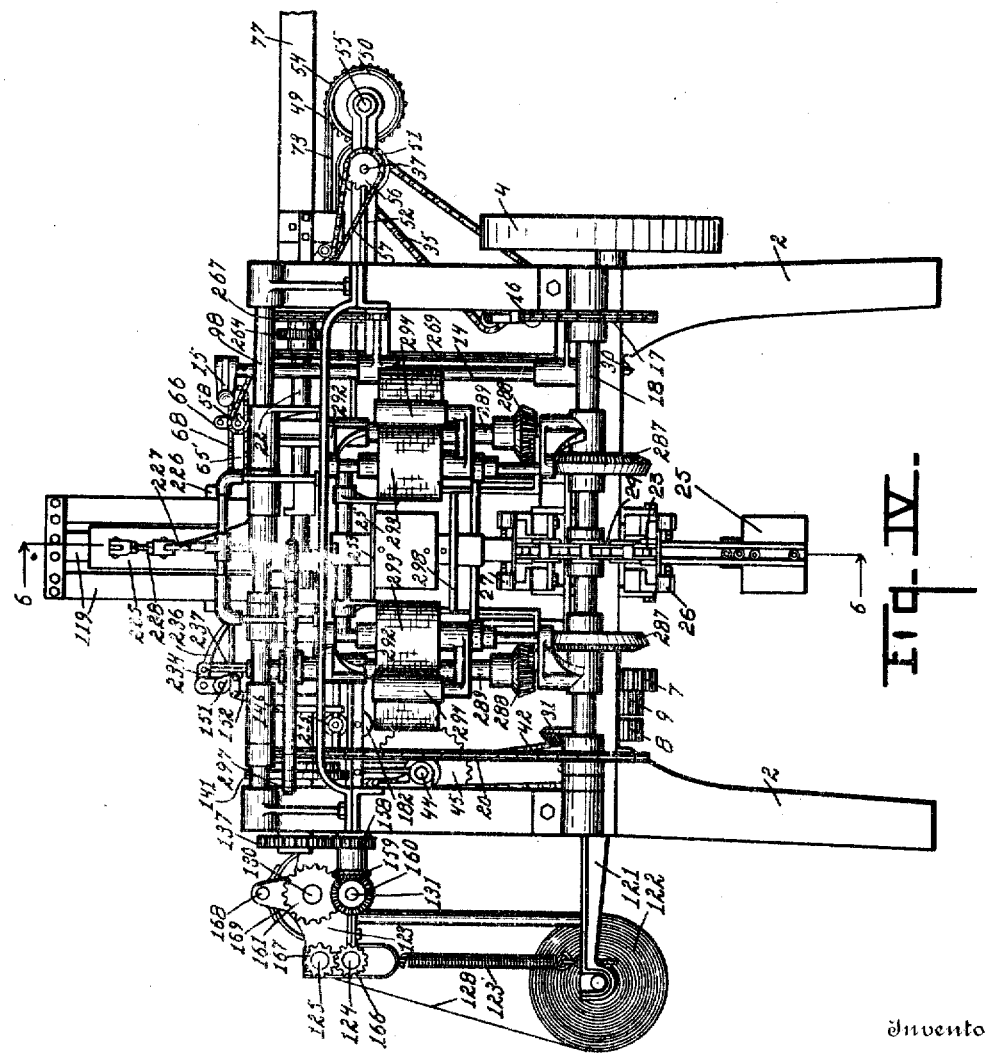

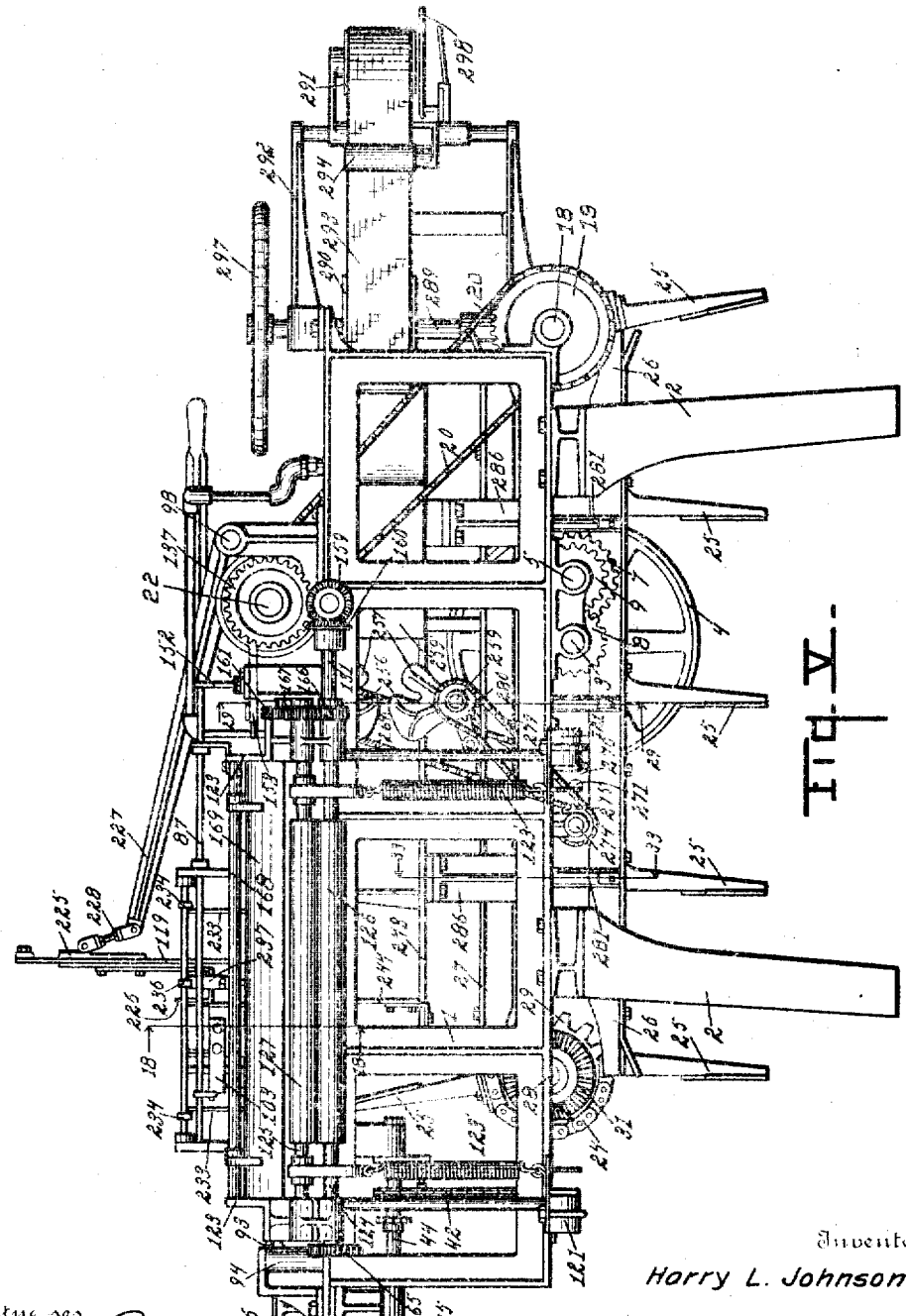

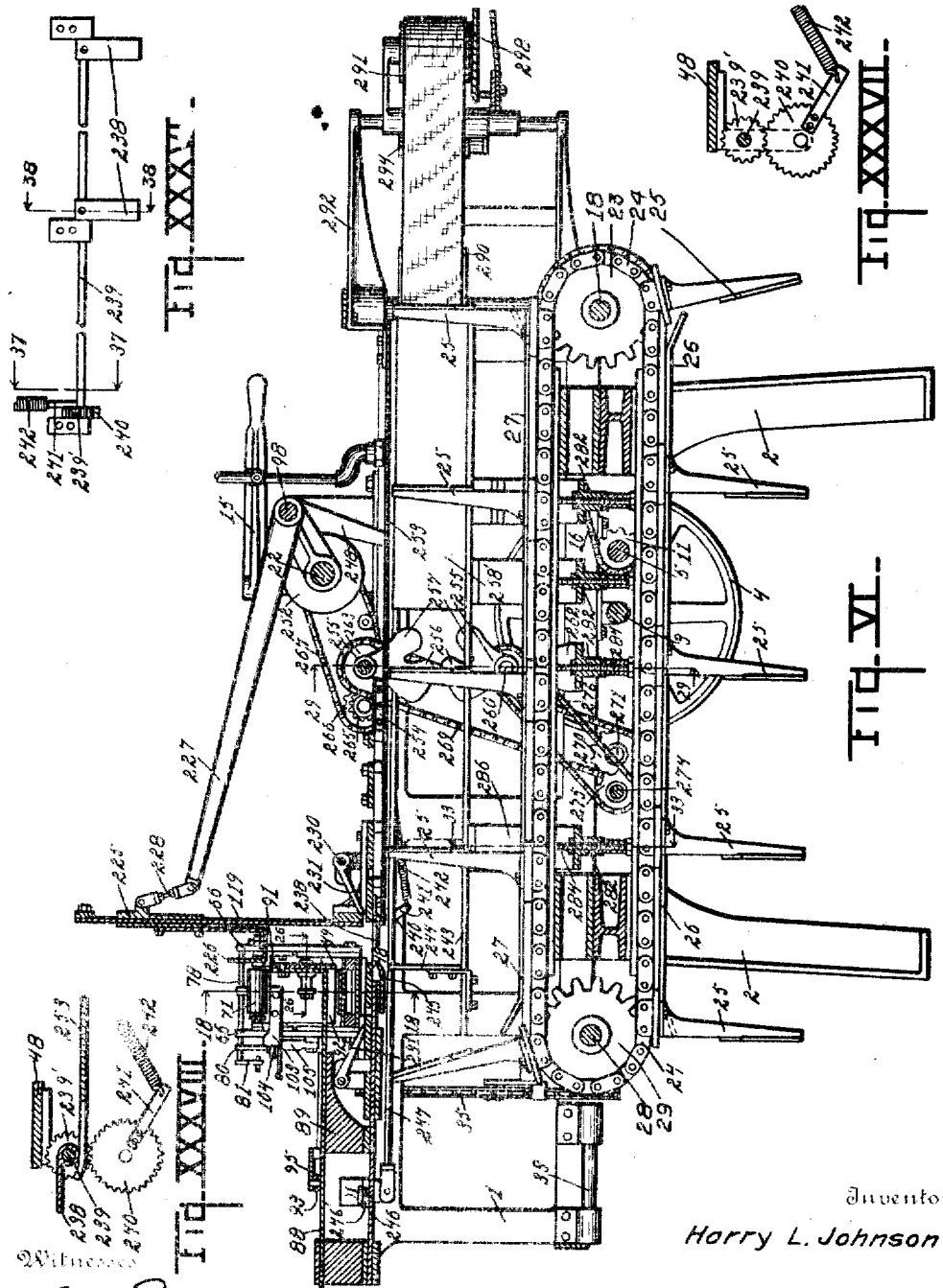

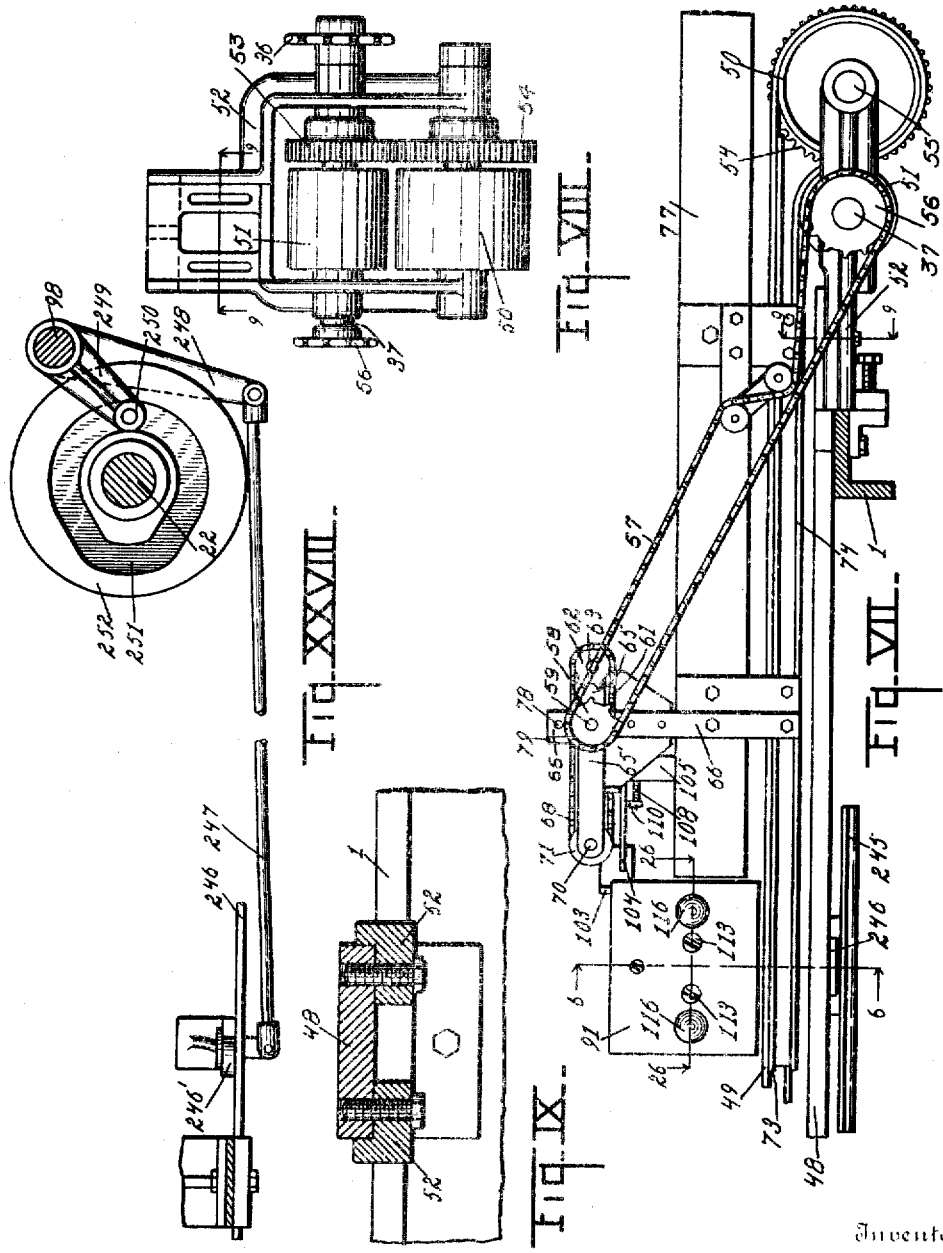

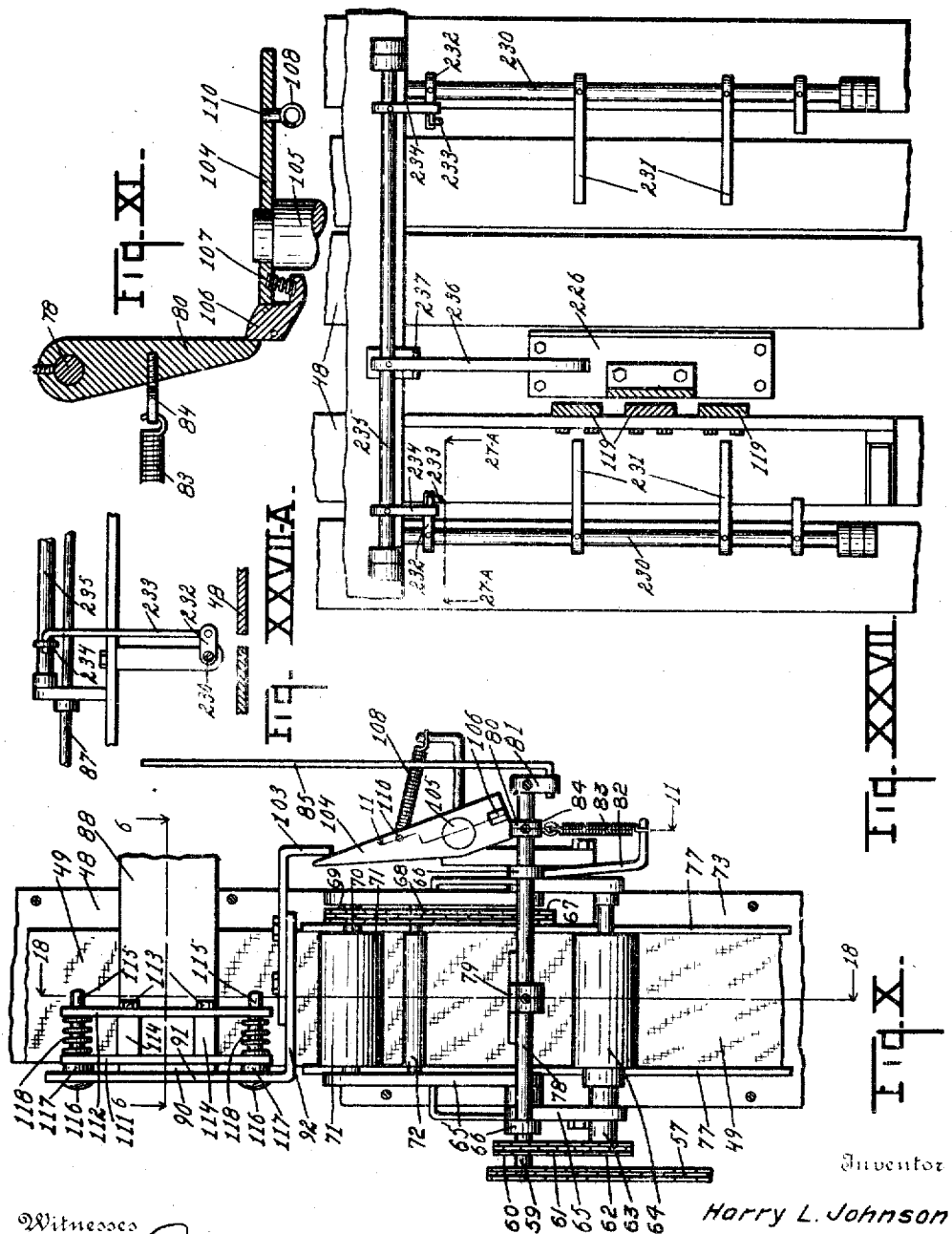

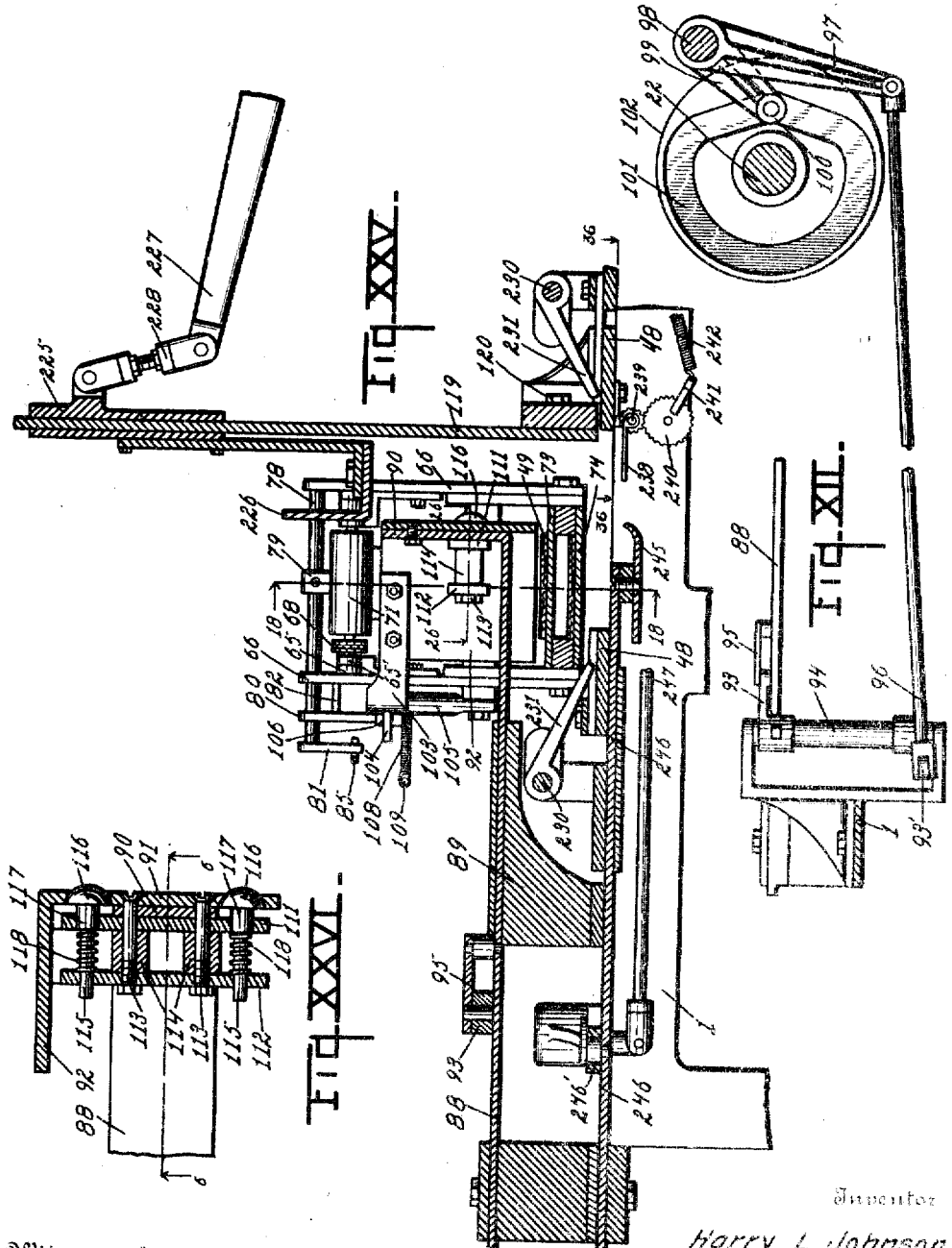

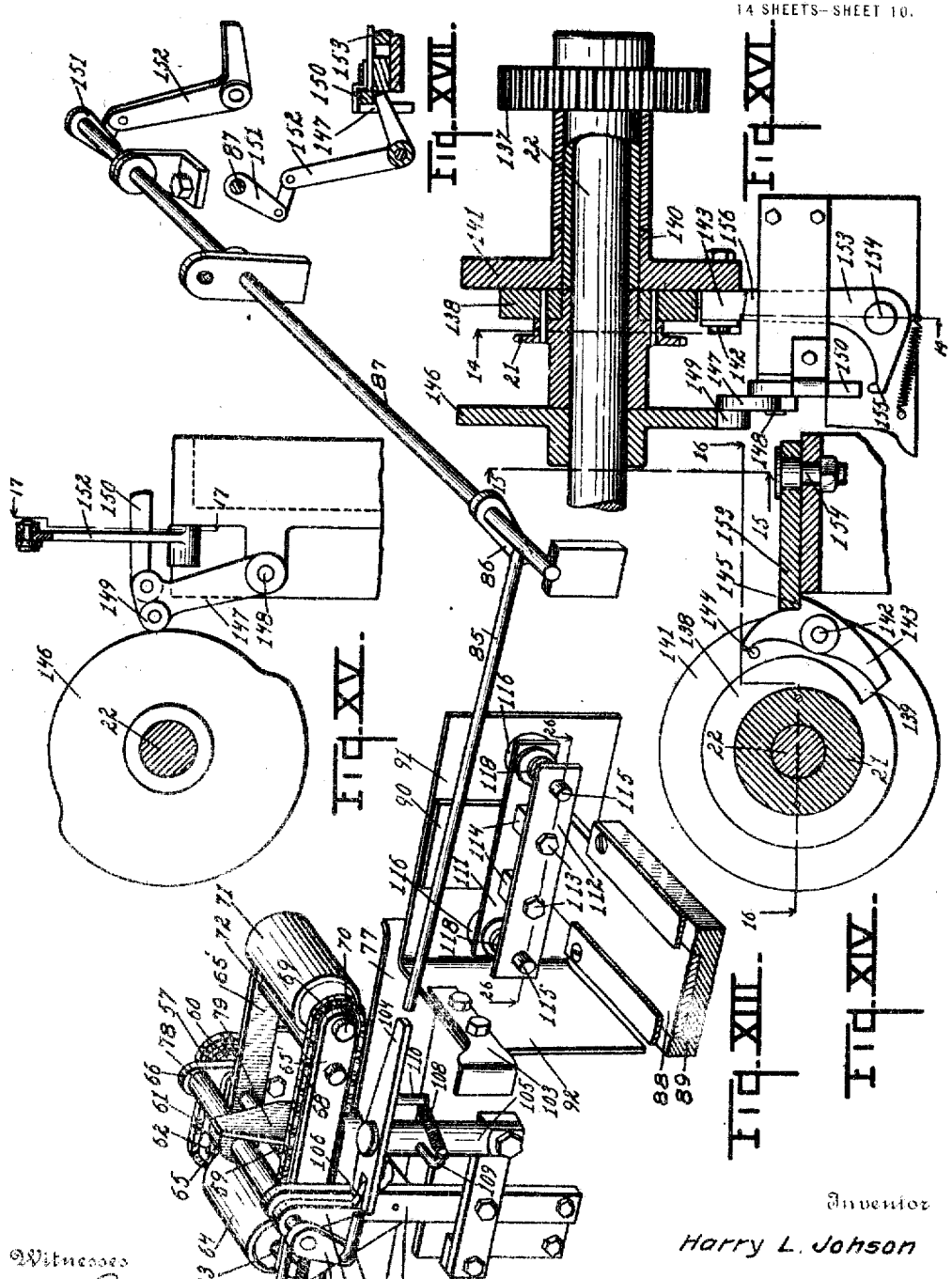

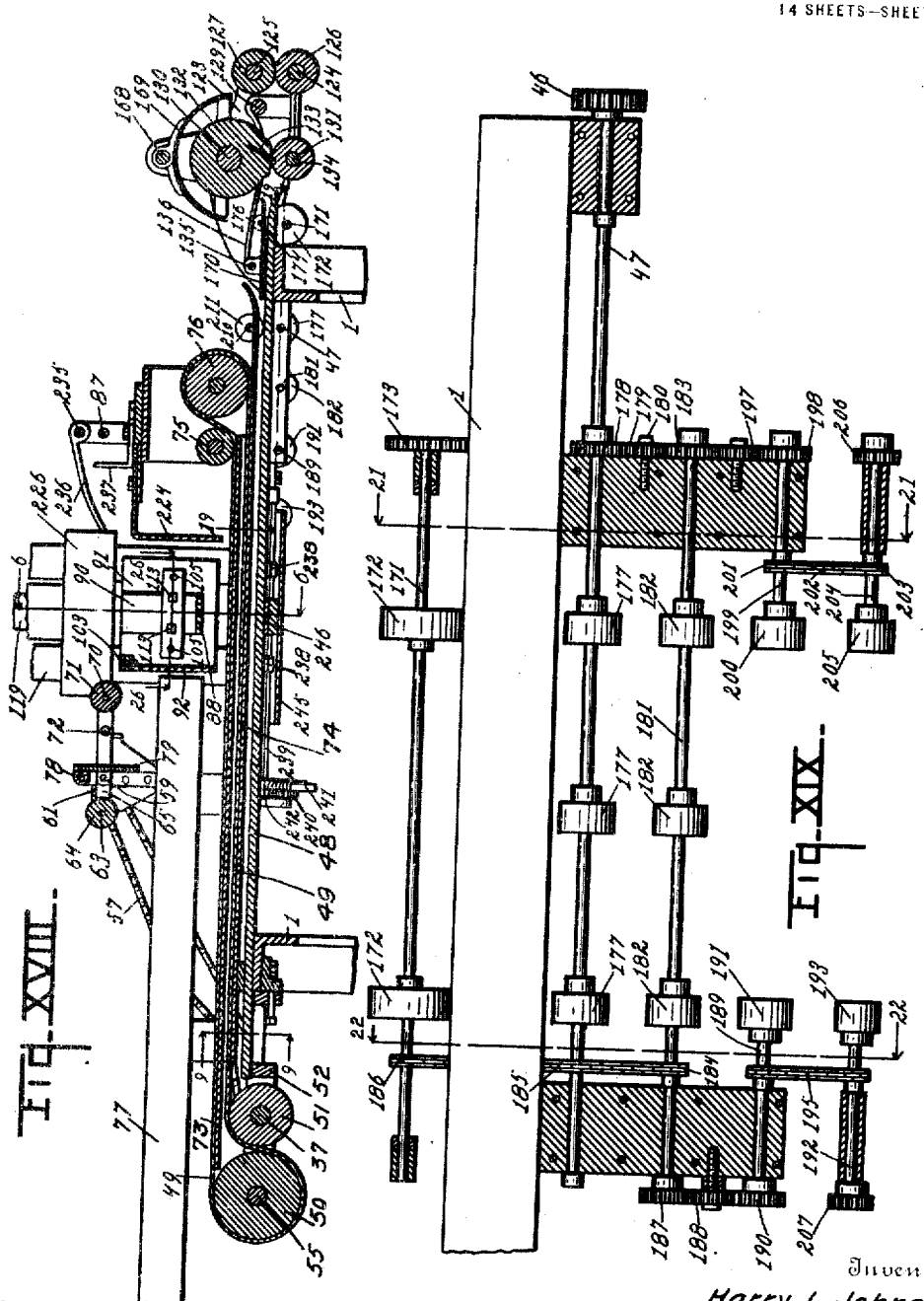

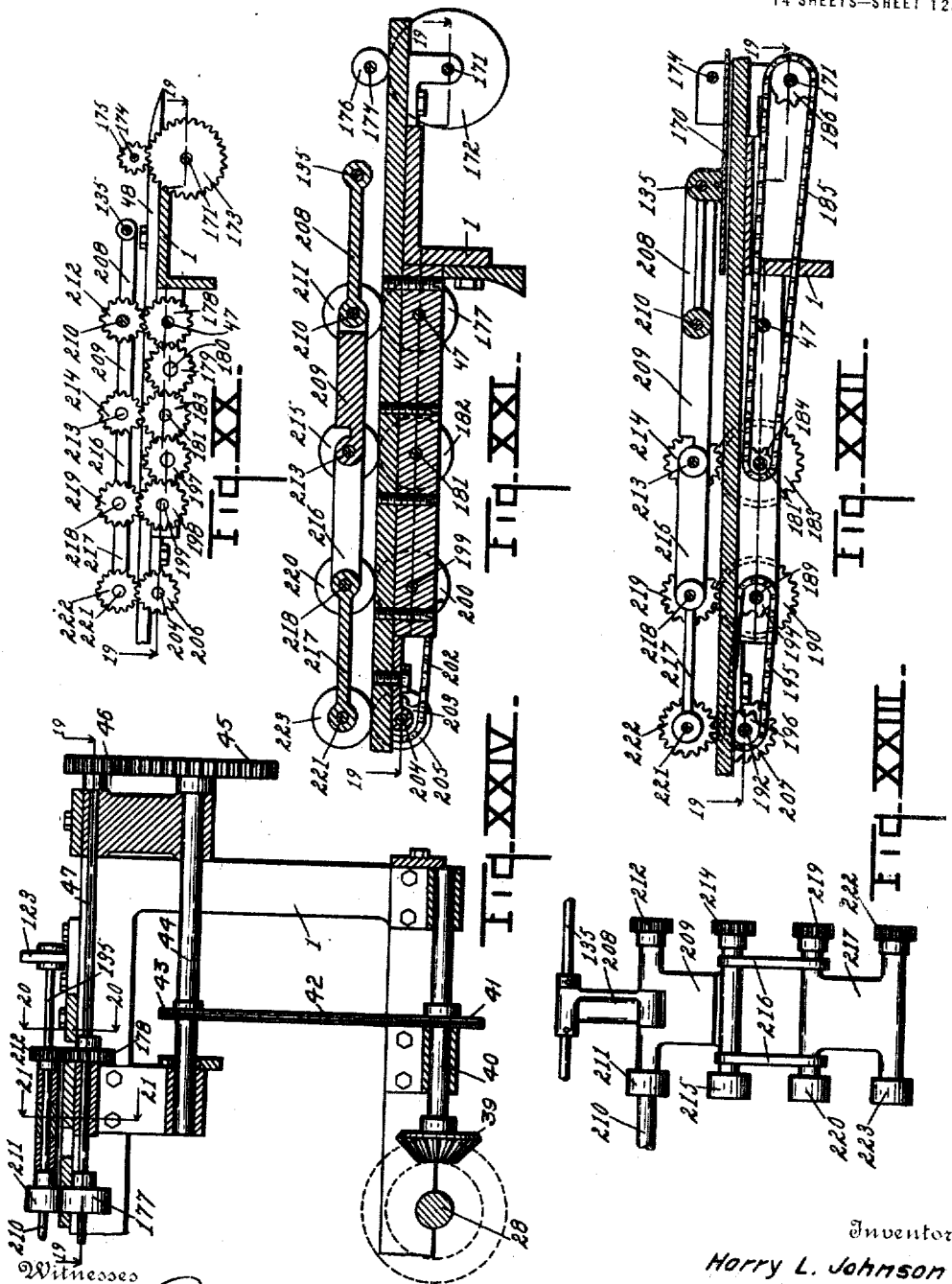

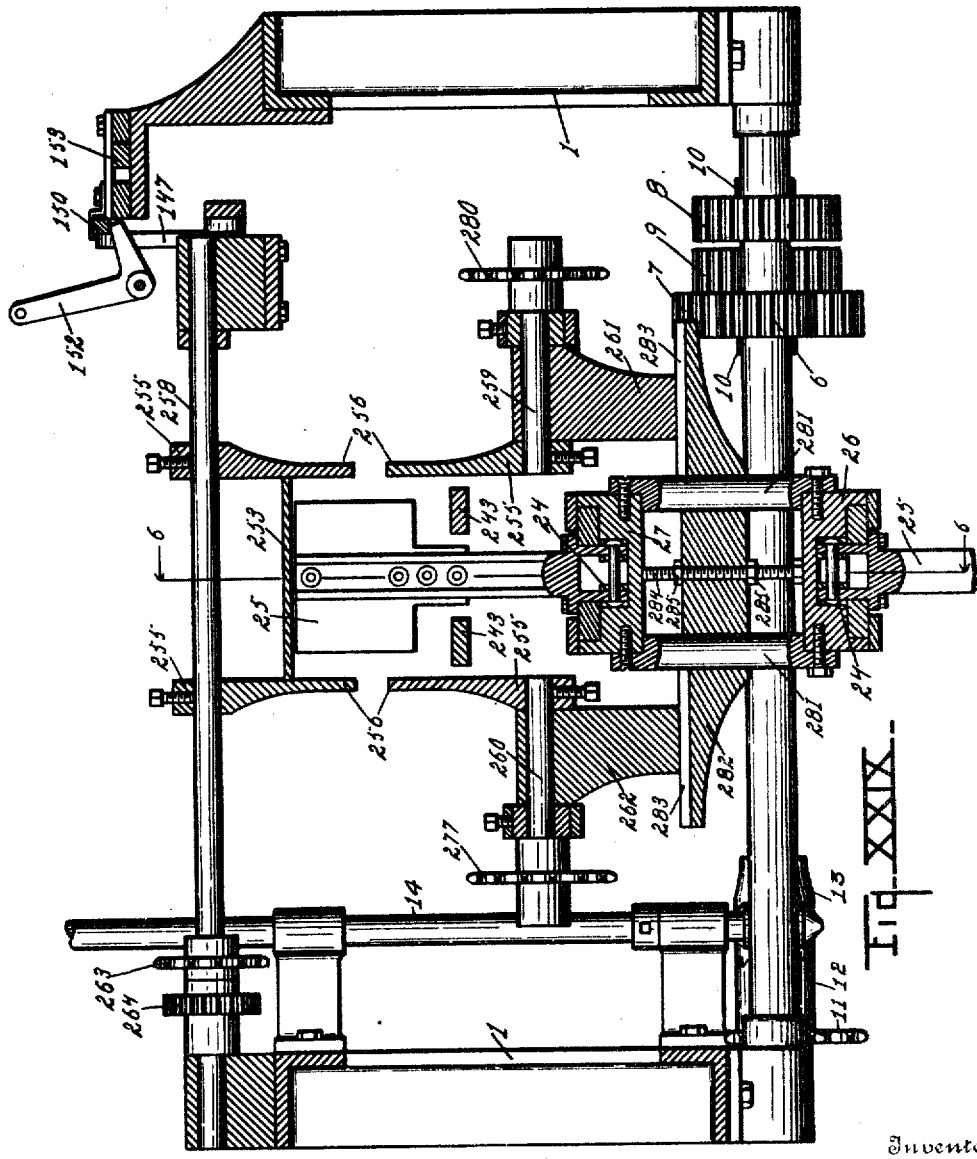

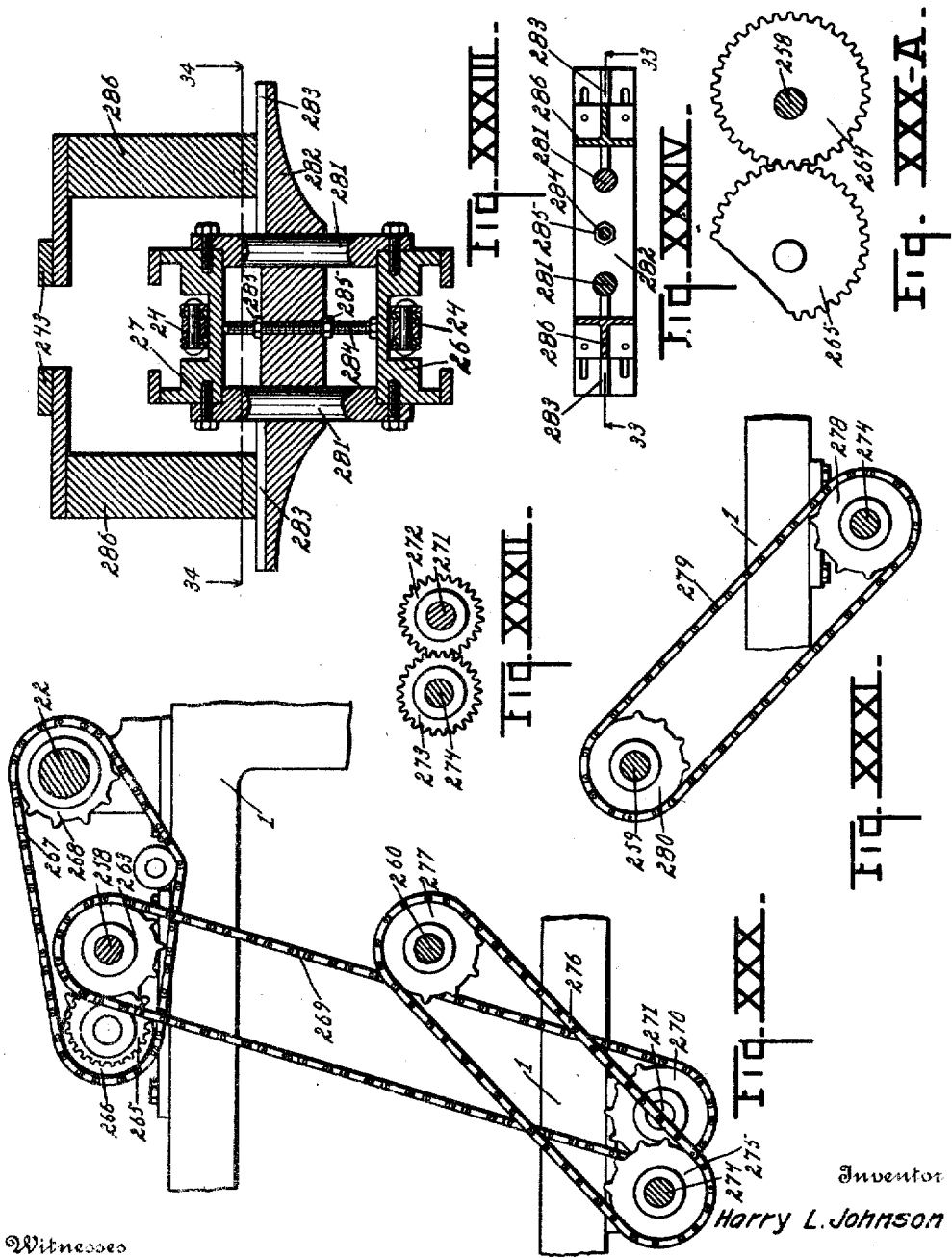

UNITED STATES PATENT OFFICE.

HARRY L. JOHNSON, OF BATTLE CREEK, MICHIGAN, ASSIGNOR TO JOHNSON AUTOMATIC SEALER COMPANY, LIMITED, OF BATTLE CREEK, MICHIGAN.

WRAPPING-MACHINE.

1,270,416.   Specification of Letters Patent.   Patented June 25, 1918.

Application filed January 30, 1915. Serial No. 5,257.

*To all whom it may concern:*

Be it known that I, HARRY L. JOHNSON, a citizen of the United States, residing at Battle Creek, Michigan, have invented certain new and useful Improvements in Wrapping-Machines, of which the following is a specification.

This invention relates to improvements in wrapping machines, and particularly to improvements in machines designed for wrapping boxes or cartons such as are commonly used for cereals and other prepared foods and to machines of the type in which said cartons are wrapped in paraffin paper and sealed by the application of heat to the overlapping portions of the paraffin paper. This invention relates to improvements in wrapping machines of the type shown in my application Serial No. 810,005, filed Jan. 2, 1914. I have illustrated in the accompanying drawings a machine of that type in which machine my improvements are embodied. Various features, however, are desirable and can be readily embodied in machines of other types.

The objects of this invention are:

First, to provide an improved automatic wrapping machine.

Second, to provide, in a wrapping machine, an improved article feed mechanism for delivering the articles to be wrapped to the wrapping conveyer.

Third, to provide improved paper feed and paper cutting means and an improved sheet delivery mechanism.

Fourth, to provide an improved wrapping mechanism.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is clearly illustrated in the accompanying drawing, forming a part of this specification, in which:

Figure I is a top plan view of a wrapping machine embodying my invention.

Fig. II is a front elevation view of the machine.

Fig. III is a left elevation view of the machine.

Fig. IV is a rear elevation view of the machine.

Fig. V is a right elevation view of the machine.

Fig. VI is a longitudinal, vertical, sectional view through the machine, taken on a line corresponding to line 6—6 of Figs. I, II, IV, VII, X, XVIII, XXVI and XXIX.

Fig. VII is a view of the article feed mechanism partly in side elevation and partly in section on a line corresponding to line 7—7 of Fig. I.

Fig. VIII is a top plan view of the support for the article feed belt pulleys and the driving means therefor.

Fig. IX is an enlarged detail sectional view on a line corresponding to the line 9—9 of Figs. VII and VIII showing in detail the connections of said pulley support.

Fig. X is a top plan view of the article feed mechanism.

Fig. XI is an enlarged detail sectional view on a line corresponding to the line 11—11 of Fig. X showing in detail the pivoted dog for the carton stop.

Fig. XII is a fragmentary detail view in side elevation showing the connection from the pusher cam to the pusher mechanism.

Fig. XIII is an enlarged detail perspective view showing in detail the carton stop, the pusher mechanism and the connections from the carton stop to the paper feed clutch.

Fig. XIV is an enlarged detail sectional view on a line corresponding to the line 14—14 of Figs. I and XVI, showing in detail the paper feed clutch mechanism.

Fig. XV is an enlarged detail sectional view on the line 15—15 of Figs. I and XVI showing in detail the cam for controlling the paper feed clutch mechanism.

Fig. XVI is an enlarged detail sectional view on a line corresponding to the line 16—16 of Fig. XIV showing the paper feed clutch controlling mechanism in further detail.

Fig. XVII is a detail sectional view on line 17—17 of Fig. XV showing in further detail the controlling mechanism for the paper feed clutch.

Fig. XVIII is an enlarged, transverse, sectional view through the machine on a line corresponding to the line 18—18 of Figs. I, III, V, VI, X and XXV, showing in detail the paper feed and cutting mechanism, the sheet delivery mechanism and the article feed mechanism.

Fig. XIX is a sectional view on a line corresponding to the line 19—19 of Figs. XVIII, XX, XXI, XXII, and XXIV showing in detail the lower feed rolls and driving means of the sheet delivery mechanism.

Fig. XX is a view partly in side elevation and partly in section on the line 20—20 of Figs. I and XXIV showing in further detail the driving means for the rolls of the sheet delivery mechanism.

Fig. XXI is an enlarged, detail, sectional view on the line 21—21 of Figs. I, XIX and XXIV showing in further detail the feed rolls and the linked supports therefor.

Fig. XXII is an enlarged detail sectional view on the line 22—22 of Figs. I, XIX and XXIV showing in further detail the driving means for the feed rolls of the sheet delivery mechanism.

Fig. XXIII is a top plan view showing the upper feed rolls and the linked supports therefor.

Fig. XXIV is an enlarged detail sectional view on the line 24—24 of Figs. I and II showing in detail the driving means for the sheet delivery mechanism.

Fig. XXV is an enlarged detail fragmentary sectional view corresponding to the part of Fig. VI at the upper left hand corner of said figure showing in detail the pusher mechanism and the plunger.

Fig. XXVI is a fragmentary detail sectional view on a line corresponding to the line 26—26 of Figs. II, VI, VII, XIII, XVIII and XXV showing in detail the yielding pins carried by the pusher.

Fig. XXVII is a fragmentary top plan view showing the paper retaining fingers in their relation to the paper feed ways, the pusher mechanism being omitted for clearness of illustration.

Fig. XXVII$^a$ is a detail sectional view on the line 27$^a$—27$^a$ of Figs. I and XVII showing in detail a part of the actuating mechanism for said paper retaining fingers.

Fig. XXVIII is a fragmentary view in side elevation showing the cam and connections for actuating the rear top flap folder.

Fig. XXIX is an enlarged, detail, sectional view on the line 29—29 of Figs. III, V and VI showing the wrapping conveyer, the wrapping conveyer ways, the top heating plate, the end flap folders and the driving means therefor.

Fig. XXX is an enlarged detail sectional view on the line 30—30 of Fig. I showing in detail the driving connections for the end flap folders.

Fig. XXX$^A$ is a detail section on line 30$^a$—30$^a$ of Fig. I.

Fig. XXXI is an enlarged detail sectional view on the line 31—31 of Fig. I showing in further detail the driving connections for the end flap folders.

Fig. XXXII is a detail, sectional view on the line 32—32 of Fig. II showing in further detail the driving connections for the end flap folders.

Fig. XXXIII is an enlarged detail sectional view on the line 33—33 of Figs. III, V, VI and XXXIV showing in detail one of the adjustable supports for the wrapping conveyer ways.

Fig. XXXIV is an enlarged, detail, sectional view on the line 34—34 of Fig. XXXIII showing in further detail said support.

Fig. XXXV is a fragmentary detail top plan view showing the two sets of driving gears by which the power shaft may be connected with the drive shaft.

Fig. XXXVI is a fragmentary, detail, sectional, top plan view taken on a line corresponding to the line 36—36 of Fig. XXV and showing in detail the yielding arms 238 and their connections.

Fig. XXXVII is a detail, sectional, view taken on a line corresponding to line 37—37 of Fig. XXXVI and showing in detail the spring connections for said yielding arms.

Fig. XXXVIII is a detail, sectional view on a line corresponding to the line 38—38 of Fig. 36 showing in detail one of said yielding arms and its relation to the top heating plate 253.

In the drawings, similar reference characters refer to similar parts throughout the several views and the sectional views are taken looking in the direction of the little arrows at the ends of the section lines.

Considering the numbered parts of the drawing, the main frame 1 comprises side and end frame members and suitable cross pieces such as are necessary to support the various parts of the machine. The frame is provided with suitable legs 2. A power shaft 3 is journaled in the frame and carries a driving pulley 4. A drive shaft 5 is journaled in the frame parallel to and slightly in the rear of the power shaft 3. A gear 6 on the power shaft 3 meshes with the gear 7 fixed on the sleeve 10 carried by the drive shaft 5. The gear 6 is considerably smaller than the gear 7 so that the drive shaft 5 turns more slowly than the power shaft 3. When operating on different sizes of cartons, it is desirable to vary the speed of the drive shaft 5, and for this purpose I provide an extra set of gears 8 and 9, the gear 8 being fixed on the power shaft 3 and the gear 9 fixed on the sleeve 10. In order to facilitate the change from one speed to the other, the gears 7 and 9 are fixed on sleeve 10 which is slidable on the drive shaft 5 and may be secured thereto by a set screw. By this means a quick shift can be made from one driving speed to the other by causing the gears 8 and 9 to mesh instead of the gears 6 and 7. It is desirable to provide this extra set of gears on the respective shafts because, after the machine is once assembled, it would be practically impossible to change gears without dismantling the machine. A sprocket 11 is fixed on a clutch member 12 which is loosely mounted on the drive shaft 5. Clutch member 13 on the drive shaft 5 is non-rotatable thereon and driven thereby. A rock shaft 14 and handle 15 serve to throw the clutch members 12 and 13 into and out of engagement with each other so that the sprocket 11 may be driven by the drive shaft 5. The sprocket 11 is connected by a chain 16 to a sprocket 17 fixed on a shaft 18 journaled in the frame at the rear end of the machine. Sprocket 19 is fixed on shaft 18 and connected by chain 20 with sprocket 21 fixed on the cam shaft 22 so that this cam shaft and the cams carried thereby are driven from the shaft 18. Sprocket 23 is fixed on the shaft 18 at the central part thereof and a wrapping conveyer chain 24 is disposed over said sprocket, said chain being provided with a plurality of flights 25. Lower and upper conveyer chain supports 26 and 27 are carried by the frame. At the forward end of the machine, a transversely extending shaft 28 is journaled, said shaft carrying a sprocket 29 over which the conveyer chain 24 is disposed said shaft 28 being driven from the shaft 18 by the wrapping conveyer chain. Bevel gears 30 and 31 are fixed upon the shaft 28, one of said bevel gears being disposed at each side of the frame. A stub shaft 33 is journaled in the frame and carries the bevel gear 32 meshing with the bevel gear 30. Sprocket 34 fixed on the stub shaft 33 is connected by chain 35 with sprocket 36 on the shaft 37 which drives the carton feed mechanism. At the other side of the frame a stub shaft 40 is journaled and carries a bevel gear 39 meshing with the bevel gear 31 on the shaft 28. The sprocket 41 on the shaft 40 is connected by chain 42 to sprocket 43 on the stub shaft 44 which is journaled in the frame and carries a gear 45 meshing with a gear 46 on a shaft 47 which is also journaled in the frame. Though these connections the sheet delivery mechanism is driven.

I have described the connections from the power shaft to the drive shaft and from the latter to the driving means for the different groups of mechanism. To recapitulate briefly, it will be seen that the drive shaft is first connected to the conveyer shaft 18 at the rear of the machine. The shaft 18 is connected to the cam shaft 22 which carries a number of cams actuating various parts of the feeding and wrapping mechanism. Shaft 18 also drives the wrapping conveyer. Connections are provided from shaft 18 to the delivery belt for delivering the wrapped cartons from the machine and these connections will be described hereinafter. The wrapping conveyer chain connects the shaft 18 with the forward shaft 28. Shaft 28 drives the article feed mechanism and the sheet delivery mechanism. The paper feeding and cutting mechanism is driven by suitable connections from the cam shaft, while the sheet delivery mechanism, which delivers the sheet in position beneath the carton, is driven from the shaft 28.

Supported by the frame and extending transversely thereof are the paper feed ways 48, upon which the sheet of paper is delivered and carried into position to receive the article to be wrapped. The articles to be wrapped are carried into position to be wrapped by means of the article feed belt 49, which extends above the paper feed ways 48 as shown in Fig. XVIII. The paper feed mechanism is disposed at one end of said paper feed ways and the article feed means extends inwardly from the other end of said paper feed ways. The belt 49 is supported at one end by the pulleys 50 and 51, the pulley 50 being carried by the shaft 55 and the pulley 51 being carried by the shaft 37, both of said shafts being journaled in a support 52 which is adjustably secured to the end of the paper feed ways. The shaft 37 is driven, as has already been pointed out, from shaft 33 and the gear 53 is secured on shaft 37 and meshes with gear 54 fixed on the shaft 55, so that the pulleys 50 and 51 are driven in opposite directions. The feed belt passes around the pulley 50 and over the pulley 51. A sprocket 56 is secured on the shaft 37 and is connected by chain 57 with sprocket 58 on the shaft 59. The shaft 59 is journaled in the upper ends of the standards 66 which are supported by the frame. The sprocket 60 on the shaft 59 is connected by chain 61 with a sprocket 62 on the shaft 63 which is journaled in the supports 65 pivoted on the standards 66. Shaft 63 carries a roll 64 which engages the tops of the cartons and assists the belt 49 in feeding them to the wrapping mechanism. A sprocket 67 on the shaft 59 is connected by a chain 68 with sprocket 69 on the shaft 70 which is journaled in the supports 65', likewise pivoted on the standards 66, and carries a roller 71 which like the roller 64 assists in delivering the articles to the wrapping mechanism. An idler roller 72 is journaled between the supports 65'. The upper reach of the belt 49 rides over the upper support 73 while the lower reach extends over the lower support 74 both of said supports being carried by the frame work. Guide ways 77, 77 are carried by the supports 73 and 74 and engage the sides of the carton at each side of the belt 49 to guide it as it is carried along by said feed belt.

A rock shaft 78 is journaled in the upper ends of the standards 66 and carries a stop 79 depending between the supports 65', 65' in position to be engaged by the articles to be wrapped as they are carried along by the article feed belt. The engagement of said articles with the stop tends to rock shaft 78 which carries arms 80 and 81. An arm 82 is secured to one of the standards 66 and has a laterally bent end to which is secured one end of the spring 83, the other end of which is secured to the arm 80 at 84. This spring tends to hold the rock shaft normally with the stop 79 in a vertical position, as shown in Fig. XIII. The arm 81 on the rock shaft 78 is connected by link 85 with an arm 86 on rock shaft 87 which extends longitudinally of the machine. This rock shaft serves to actuate the clutch mechanism for the paper feed drive.

A reciprocating bar 88 is mounted longitudinally of the frame of the machine and guided on suitable ways 89. The forward end of said reciprocating bar is provided with a vertically extending portion 90 to which is secured a pusher member 91 having a portion 92 bent at right angles to the body of the pusher member and extending in a plane at right angles to the article feed belt as shown in Fig. XVIII. The bar 88 is reciprocated by means of the arms 93 and 93' fixed on rock shaft 94, arm 93 being connected to the bar 88 by the link 95. The arm 93' is connected to and actuated by the link 96, connected at its forward end to the arm 97 on the rock shaft 98, said rock shaft 98 being journaled in the frame and having an arm 99 with a roller 100 engaging in cam way 101 of cam 102 which is fixed on the cam shaft 22 journaled in the frame as has been heretofore described. By this means, as the cam shaft 22 revolves, the bar 88 will be reciprocated to carry the pusher member 91 back and forth across the article feed belt and above the same, the relation of the parts appearing in Fig. XVIII.

A trip member 103 is secured to the portion 92 of the pusher member 91, said trip member being disposed to engage the end of the lever 104, which is pivoted on the standard 105, as the pusher member moves to its inner position with the portion 92 extending across the article feed belt. Lever 104 has a dog 106 pivoted in the other end thereof and provided with a spring 107 normally tending to throw the outer end of the dog 106 above the plane of the lever 104 so as to engage the end of the arm 80 on the rock shaft 78. A spring 108 is connected at one end to an arm 109 extending from the standard 105 and at the other end to a pin 110 carried by the lever 104, said spring 108 tending to hold the lever 104 in such position that the dog 106 will engage the end of the arm 80 to prevent the rocking of shaft 78. As the pusher 91 is reciprocated, the trip member 103 engages the end of the lever 104, rocks the lever 104 on its pivot and carries the dog 106 from in front of the arm 80 so as to permit the shaft 78 to be rocked by the carton pushing against the stop 79. This causes the reciprocation of the link 85 and the consequent actuation of the rock shaft 87 which operates the paper feed clutch mechanism.

Bars 111 and 112 are secured to the vertical portion 90 of the bar 88 and to the pusher member 91 by means of the bolts 113, said bars being spaced apart by the spacing blocks 114. Pins 115 are slidably mounted in said bars 111 and 112, said pins having rounded heads 116 extending slightly beyond the front surface of the pusher member 91. Each of said pins has a shoulder 117 and a spring 118 engages the rear bar 112 and the shoulder 117 to yieldingly hold the pins with their heads projecting beyond the front surface of the pusher 91. When the pusher member engages a carton, the spring pressed pins 115 yield slightly so that the carton is yieldingly held in position by the pusher member. A standard 119 is secured to the frame by the bolts 120 and extends vertically upward in such a position that, as a carton is delivered by the carton feed belt in front of the pusher member 91, upon reciprocation of the bar 88, the pusher member 91 shoves the carton laterally against and holds it in engagement with the standard 119 until such time as it shall be forced downward upon the sheet of paper in which it is to be wrapped.

I will now describe the paper feed and cutting mechanism and the sheet delivery mechanism, by means of which a sheet of paper of the required size is cut from the web of paper and delivered to a position beneath the carton so that the carton may be forced down upon it. A roll of paper 122 is carried by arms 121 secured to the side of the frame. The paper feed rolls are journaled in brackets 123 secured to the side of the frame. Shafts 124 and 125 are journaled in the outer ends of said brackets 123, the upper shaft 125 being movable vertically in its bearing. These shafts carry the feed rolls 126 and 127 respectively, between which the web of paper 128 passes. The roll 127 is held yieldingly against roll 126 by the springs 123' connected at their lower ends to arms 121. Just in front of the roll 127 is journaled an idler roll 129 over which the paper passes. The shaft 130 is journaled in the brackets 123 and carries the cutter roll 132 having the knife 133 which coacts with the roll 134 on the shaft 131 to cut the paper into sheets of proper size. A rod 135 is carried by the frame and guide fingers 136 are secured thereto and extend outwardly therefrom, lying in grooves in the cutter roll 132, the ends of said fingers extending above the idler roll 129. These fingers serve to guide the paper over the idler roll and in between the paper cutting rolls and deliver the sheet in proper relation to the paper feed ways 48.

A collar 138 is fixed on the cam shaft 22 being secured thereto in proximity to the sprocket 21 by means of which said shaft is driven. The collar 138 is provided with a notch 139. A sleeve 140 is loosely mounted on the cam shaft and provided with a flange 141 on which a pawl 143 is pivoted at 142, the engaging end of said pawl being adapted to engage the notch 139 in the collar 138. The flange 141 carries a pin 144 adapted to engage the tail of the pawl to limit the movement thereof. The pawl is provided with a shoulder 145 which is disposed to be engaged by the end 156 of the bell crank 153. The pawl 143 is provided with a suitable spring so that the engaging end of the pawl is thrown into engagement with the notch 139 of the collar 138 when the arm of bell crank 153 is out of engagement with the shoulder 145. A cam 146 is fixed on the cam shaft 22 and arm 147 is pivoted to the frame at 148 and carries at its upper end a roller 149 engaging the periphery of the cam 146. A link 150 is connected to the upper end of the arm 147 and is suitably guided on the frame, as shown in Fig. XVI. An arm 151 is fixed on the rock shaft 87, said arm being connected to one arm of the bell crank lever 152 which is pivoted on the frame so that its other arm extends beneath and supports the link 150 so that as said rock shaft 87 is actuated and the bell crank 152 is rocked with it, the link 150 will be lowered to such a position that the end of the link 150 engages the tail 155 of bell crank 153. The bell crank 153 is pivoted at 154 and its tail 155 is disposed contiguous to the end of the link 150. The other arm 156 of the bell crank 153 is disposed to engage the shoulder 145 of the pawl 143 so as to withdraw the engaging end of said pawl 143 from engagement with the notch 139. When the arm of the bell crank 152 is in its upper position, the end of the rod 150 does not engage the tail of the bell crank 153 when it is reciprocated, but when the rock shaft 87 is rocked to lower the arm of the bell crank 152, the link 150 is lowered until, when it is reciprocated by the cam 146, it engages the tail 155 of the bell crank 153 to actuate the same and withdraw the pawl 143 from the notch 139 so as to throw the clutch members into engagement.

The gear 137 is fixed on the outer end of sleeve 140. This gear meshes with the gear 158 which is connected to the bevel gear 159, the latter meshing with the bevel gear 160 on the end of shaft 131. Shaft 131 carries a gear meshing with the gear 161 on shaft 130. On the other end of shaft 131 is fixed gear 162 which meshes with a gear 163 adjustably journaled in a link 164 pivoted on the bracket 123. The gear 163 meshes with gear 165 fixed on the end of shaft 124. On the other end of the shaft 124 is fixed a gear 166 meshing with a gear 167 on shaft 125. It will thus be seen that all of the paper feed rolls and the paper cutting rolls are driven from the gear 137 and that the latter gear rotates during but part of the revolution of the cam shaft because of the clutch mechanism which is controlled by cam 146 on the cam shaft, and by the end of the bell crank lever 152 which is actuated by the rock shaft 87 controlled by the arm 81 on the rock shaft 78 which carries the stop 79. It will thus be seen that when the cartons are being fed regularly through the machine so that the stop 79 is turned out of the vertical, the arm of the bell crank lever 152 will be lowered so that at each revolution of the cam 146, the raised part thereof will actuate the link 150 to cause it to engage the tail 155 of the bell crank 153 to allow the clutch members to spring into engagement so that the gear 137 will be driven by the cam shaft 22. It will therefore be apparent that the paper feed mechanism will be driven during a part of the revolution of the cam shaft and that it will not be driven at all unless cartons are being fed into the machine.

The rod 168 is carried by the brackets 123 and a guard casing 169 for the paper cutting rolls is supported upon said rod. Guide fingers 170 are carried by the frame and the sheet of paper is delivered from the paper cutter upon the paper feed ways 48, the edges of the sheet being guided by said fingers 170. A shaft 171 is journaled in the frame and carries a pair of rollers 172 which engage the bottom of the sheet of paper as it is delivered from the paper cutter. A shaft 174 is journaled in the frame above said shaft 171 and carries a pair of rollers 176 coöperating with the rollers 172 and a spur gear 175 meshing with the spur gear 173 on the end of shaft 171, so that shafts 171 and 174 are driven in opposite directions, the sheets of paper being delivered from the paper cutter between the rollers 172 and 176. Shaft 47 is journaled in the frame and driven by the gear 46. This shaft carries a plurality of rollers 177 and a gear 178 meshing with a gear 179 journaled on the pin 180 carried by the frame.

A shaft 181 is journaled in the frame parallel to the shaft 47 and carries a plurality of rollers 182 and a gear 183 meshing with the gear 179. The shaft 181 also carries the sprocket 184 connected by chain 185 with sprocket 186 on the shaft 171. A spur gear 187 is fixed on shaft 181 and meshes with a spur gear 188 journaled on the frame and meshing with a gear 190 carried by the stub shaft 189 which has fixed thereon a roller 191. A second stub shaft 192 is journaled in the frame parallel to shaft 189 and carries a roller 193 and a sprocket 196 connected by chain 195 with the sprocket 194 on shaft 189, said shaft 192 also carries a gear 207. A gear 197 is journaled on the frame and meshes with the gear 183. A stub shaft 199 is journaled in line with shaft 189, said shaft being provided with a spur gear 198 meshing with the gear 197 and carrying a roller 200, and a sprocket 201 connected by chain 202 with sprocket 203 on the stub shaft 204 which is parallel to the shaft 199 and in line with the shaft 192. The shaft 204 carries a roller 205 and a spur gear 206. Power is delivered to the whole system of shafting on which these lower rollers are carried by means of the shaft 47 driven by the gear 46. It will be seen that all of the shafts are driven in the same direction and all of these rollers engage the bottom of the sheet of paper to carry it into position beneath the carton.

A pair of link members 208 are journaled on the rod 135 and are pivotally connected to members 209. The shaft 210 extends through members 209 and 208 connecting them together, as appears in Fig. I. The shaft 210 carries a gear 212 and a pair of rollers 211 coöperating with the outer rollers 177 on shaft 27. Gear 212 meshes with the gear 178 so that the shafts 210 and 47 are driven in opposite directions. In the other end of each member 209 is journaled a shaft 213 carrying gears 214 and a roller 215, one of said gears 214 meshing with the gear 183 on shaft 181 and the other gear meshing with the gear 187 on shaft 181. The rollers 215 coöperate with the corresponding rollers 182. Each member 209 is connected by links 216 to the shaft 218 extending through the link member 217. Shafts 218 carry gears 219 and rollers 220. The rollers 220 coöperate with the corresponding rollers 191 and 200 and the gears 219 mesh with the gears 190 and 198 respectively. In the outer ends of members 217 are journaled shafts 221 on each of which is fixed a roller 223 and a gear 222 coöperating with the rollers 193 and 205 and the gears 206 and 207 respectively. It will be seen that I have provided a set of feed rollers engaging the bottom of the sheet and a corresponding set of feed rollers engaging the top of the sheet, the latter rollers being driven in the opposite direction from the bottom rollers and being carried by a linked supporting structure by means of which the top rolls can be easily removed in case access to the bottom rollers is desired.

A stop member 224 is secured to the frame and is provided with a vertical portion depending across the top of the feed belt 49 in a plane at right angles thereto and forming a stop to limit the movement of the carton carried by said carton feed belt. A slide member 225 is slidably mounted upon the standard 119 and carries at its lower end a plunger 226 which engages the top of the carton, held by the pusher 91 against the standard 119, so as to force said carton down upon the wrapping paper and to force the carton and wrapping paper down upon the wrapping conveyer ways through an opening provided in the paper feed ways. The slide member 225 is connected by a link 228 to the end of an arm 227 on the rock shaft 98, said arm being actuated by a cam 229 on the cam shaft 22.

A pair of rock shafts 230 are journaled on the frame, extending transversely thereof a slight distance above the paper feed ways 48 upon which the sheet of paper rests. Each of these rock shafts carries a number of fingers 231 which rest upon the surface of the sheet of paper which has been fed into place upon the paper feed ways beneath the carton, said fingers resting upon the paper and serving to hold it under a slight tension so that as the carton is forced downwardly the paper withdraws gradually from beneath the fingers and is wrapped smoothly around the carton. On each rock shaft 230 is secured an arm 232 connected by a link 233 with an arm 234 fixed on the rock shaft 235 which is journaled on the frame. Said rock shaft 235 has an arm 236 which extends over and rests upon the top of the plunger 226 so that as said plunger moves upward, toward the limit of its upward movement, the arm 236 will be lifted, rocking the shaft 235 and rock shaft 230, and lifting the fingers 231 to permit a new sheet of paper to be fed into place upon the ways beneath the fingers 231 so that, when the plunger starts to descend to force a carton downward, the fingers will descend and rest upon the paper holding it under slight tension. A stop 237 is secured to the frame in such position as to limit the downward movement of the fingers 236 as will appear from Fig. XVIII.

Arms 238 are fixed on the shaft 239 which is journaled on the under side of paper feed ways 48 and carries a small gear 239' meshing with the gear 240 which is journaled in hangers carried by the frame and has connected thereto an arm 241 to the end of which the spring 242 is connected, said spring acting to hold arm 238 normally in a horizontal position so that said arm acts as a yielding support for the sheet of paper and the carton above it. Shaft 239 is disposed beneath the paper feed ways 48 and above the rear end of the top heating plate 253 which is slotted to permit the swinging of the arms 238 as they are forced to swing around by the movement of the carton with which they are in engagement. The plunger 226 engaging the top of the carton which has been pushed forward into engagement with the standard 219 by the pusher member, forces said carton downwardly against the tension of the spring supporting arms 238 until the carton rests on ways 243 thus wrapping the sheet of paper around the sides and bottom of the carton and bringing the carton and sheet of paper to rest upon the wrapping conveyer ways 243 in front of the rear stop 244. As the carton is carried forward by the wrapping conveyer the arms 238 are forced backward as the carton passes and thus fold the front top flap rearwardly upon the rear top flap which has previously been folded down upon the carton. The rear top flap of the paper is folded down on the carton by the folder 245 which is carried by the front end of the reciprocating bar 246 guided in ways on the frame and connected by a link 247 with an arm 248 on the rock shaft 98 which is provided with an arm 249 carrying a roller 250 engaging in the cam way 251 of the cam 252 on the cam shaft 22. As the cam shaft 22 revolves, the cam causes the link 247 to reciprocate moving the bar 246 and the folder 245 back and forth. The front upturned edge of the folder 245 engages the rear edge of the wrapper and folds it forwardly upon the top of the carton. The flight 25 of the wrapping conveyer engages the rear of the carton and carries it forward upon the conveyer ways 243, the front edge of the wrapper being engaged by the arms 238 and the rear end of top heating plate 253, so that the front top flap is folded down upon the top of the carton to complete the top fold thereof.

The flight 25 of the conveyer, engaging the rear of the carton, carries it along upon the wrapping conveyer ways 243. At 254, a steam box is provided, connected with a suitable source of steam and adapted to heat the top heating plate 253 so that as the cartons, with the edges of the wrapper folded over the top thereof, are brought beneath this heating plate, the wax contained in the wrappers is melted to seal the top fold. It will be understood that to seal the wrappers in this way, I use as a wrapping paper, a paper impregnated with wax or paraffin and commonly known to the trade as a self-sealing wax paper.

The carton is carried along on the conveyer ways by the wrapping conveyer from the top heater to the end flap folders 255. There are four of these end flap folders, two above and two below, the two upper folders being mounted on the shaft 258, which is journaled in the frame, with the folders close to the edges of the top heating plate 253 as shown in Fig. XXIX. The lower folders are mounted on stub shafts 259 and 260 suitably journaled in blocks 261 and 262 adjustably mounted on the frame. Each end flap folder consists of a folder finger 256 and a folder finger 257, each folder finger being so disposed relative to the other and the movement of the end folders being so timed that the fingers 256 move from above and below to engage the top and bottom end flaps and fold them inwardly upon the end of the carton. The fingers 257 then engage the rear end flaps and fold them forwardly and inwardly upon the top and bottom end flaps.

The shaft 258 is driven by the gear 264 mounted thereon which meshes with a gear 265 fixed on a stub shaft which carries a sprocket 266 connected by chain 267 with sprocket 268 on cam shaft 22. The gears 264 and 265 are eccentrically mounted on their respective shafts as shown in Fig. XXX^A so that the shaft 258 is driven with a variable speed as well as the shafts 259 and 260 which are driven therefrom. The eccentricity of the gears 264 and 265 is such that the end flap folders move with increased rapidity during the folding operation. The shaft 258 carries a sprocket 263 connected by a chain 269 to the sprocket 270 on the stub shaft 271, the latter shaft being provided with a gear 272 meshing with a gear 273 on a stub shaft 274 journaled in the frame and carrying a sprocket 275 connected by chains 276 with sprocket 277 on shaft 260. This drives one of the lower end flap folders. The shaft 274 extends transversely of the machine and at the other end thereof is fixed a sprocket 278 connected by chain 279 with sprocket 280 on shaft 259 which drives the other lower end flap folder.

Beyond the end flap folders, the side heating plates 258' are supported on either side of the conveyer ways 243. These side heating plates are heated by the steam boxes 259' which are supplied with steam from a suitable source, the side heating plates extending to the rear of the machine and terminating near the beginning of the delivery belts 293. Said heating plates engage the end folds of the cartons, the wax being melted by the heat so as to seal the overlapping ends.

The lower and upper conveyer chain supports 26 and 27 are supported by the frame and are connected at intervals by rods 281 secured to each of said supports. On each pair of rods is slidably mounted a block 282 provided on its upper surface with ribs 283 as shown in Figs. XXIX, XXXIII and XXXIV. Blocks 261 and 262 are slidably mounted upon one of said blocks 282, being provided with notches engaging said ribs, so that said blocks 261 and 262 may be adjusted to vary the distance between the end flap folders. The top end flap folders can be adjusted upon the shaft 258 by adjusting the set screws by which they are secured to said shaft. A bolt 284 is secured to the supports 26 and 27 respectively, extends through the block 282, and is provided with nuts 285 threaded thereon above and below said block. By adjusting said nuts upon the bolt, the height of the block 282 can be adjusted so that the height of the blocks 261 and 262 can be adjusted to bring the end flap folders to the proper position to accommodate cartons of different sizes. Upon the other blocks 282, blocks 286 are adjustably mounted which support the ways 243 so that the height of and distance between said ways can be adjusted to take care of cartons of different size.

Bevel gears 287 are fixed upon the shaft 18 and mesh with bevel gears 288 carried by the vertical shafts 289 which are journaled in the frame and upon which pulleys 290 are mounted. Pulleys 291 are journaled upon the outer ends of links 292 and delivery belts 293 are disposed over the pulleys 290 and 291 and engage idler pulleys 294 carried by arms 295 supported by links 292. Supporting plates 296 are carried by the frame and disposed inside of the inner reaches of the belt 293 as shown in Fig. I. The hand wheel 297 is provided on one of the shafts 289 so that the same may be turned around by hand. Beneath the outer end of the belt 293 is provided a platform 298 upon which the wrapped and sealed cartons are discharged from the delivery belt.

From the description of the parts given above, the operation of the machine will be very readily understood. The cartons are, in this machine, wrapped in waxed paper which is carried on the roll 122, the web of paper 128 being fed by the feed rolls 124 and 125 between the paper cutter rolls 132 and 134 so as to sever the paper into sheets of desired length. The paper is then gripped by the sheet delivery rolls and carried by said sheet delivery mechanism to a position upon the paper feed ways beneath the carton which has been brought into position and held against the standard 119 by the pusher 91. The cartons or articles to be wrapped are placed upon the feed belt 49 and are carried by said belt into the machine. As the cartons are carried along by said belt, they engage the carton stop 79 and rock the shaft 78 when the pusher 91 is in its inner position so that the arm 80 is free to allow the shaft 78 to be rocked. In this position, the carton will be carried by the feed belt 49 and the rolls 64 and 71 inwardly until it engages the portion 92 of the pusher 91. When the pusher moves back, the feed roll 71 and the feed belt 49 will carry the carton inwardly in front of the pusher 91, so that the next movement of the pusher member will shove the carton laterally from the feed belt into engagement with the standard 119, the carton being held yieldingly against the standard 119 by the spring pressed pins carried by the pusher. While this movement has been taking place, the sheet of paper has been delivered to position beneath the carton. The paper feed mechanism, being controlled by the carton stop 79, is only actuated to feed a sheet of paper into the machine when the cartons are being fed along on the feed belt 49. The carton being held in position against the standard 119 by the pusher 91, the plunger 226 now descends, engaging the top of the carton and forcing it downwardly. As the plunger 226 starts to descend, it allows the fingers 231 to drop on the sheet of paper to hold the same under a slight tension so that it will be wrapped smoothly around the carton. The carton is forced by the plunger 226 down against the yielding supporting arms 238 turning them to one side so that the carton is forced downwardly through the opening in paper feed ways 48 until it rests upon the wrapping conveyer ways 243 just in front of the stop 244. The folder 245 is now moved forward by the reciprocating bar 246 on arm 246' which is actuated by a cam on the cam shaft, and folds the rear edge of the sheet forwardly upon the top of the carton. The carton is engaged by a flight 25 of the wrapping conveyer and is carried forward on the conveyer ways 243. The yielding arms 238 fold the front edge of the sheet rearwardly upon the top of the carton forming the top fold of the wrapper. The carton and wrapper is now carried forward beneath the top heating plate 253 which seals the top fold. The carton and wrapper is now carried to the end flap folders 255, the fingers 256 of which swing upwardly folding in the top and bottom end flaps while the fingers 257 engage the rear flap to fold it forwardly and inwardly upon the ends of the carton. As the carton is carried forward by the conveyer from the end flap folder, the front flap is engaged by the side heating plates and folded inwardly upon the end of the carton completing the end folds thereof. At the same time the side heating plates, which are heated by the steam boxes, melt the wax contained in the paper and seal the end folds. After passing the side heating plates, the cartons are carried by the conveyer between the delivery belts which engage the ends of the carton and carry it outwardly until it is deposited upon the platform 298 at the end of the machine.

The blocks, upon which the shafts for the lower and flap folders are journaled, are adjustable as has been pointed out and the wrapping conveyer ways are also adjustable so that the machine may be very readily adjusted to take care of different sizes of cartons. In this connection, I would point out that I have provided two sets of driving gears, one of which is adapted to drive the machine at a different rate of speed from the other, these sets of gears being both mounted on the driving and power shafts so that a quick change can be made from one set of driving gears to the other. The other parts of the machine, where it is essential, are so constructed that they can be readily adjusted to take a different size of carton.

The machine which I have here shown and described is a carton wrapping machine, especially adapted for wrapping cartons of the size and shape commonly used for breakfast foods and cereals. Many parts of my invention, however, are adapted for use in article wrapping machines generally and I do not wish to be restricted to a carton wrapping machine specifically. I have shown steam boxes for heating the top and side heating plates but in many instances, I have found it advisable to use electric heating units or gas burners in place of these steam boxes and such a substitution is entirely in accordance with the spirit of my invention. I am aware that the particular embodiment which I have here shown is susceptible of considerable variation without departing from the spirit of my invention and therefore, I do not wish to be restricted to the same. I have found, however, that this form is to be preferred and, therefore, I desire to claim the same specifically as well as broadly as indicated by my appended claims.

Having thus described my invention, what I claim as new and desire to secure by Letters Patent is:

1. In a machine of the class described, the combination of conveyer ways, a wrapping conveyer for carrying the articles to be wrapped along on said ways, an article feed belt, paper feed ways, means for delivering a sheet of paper upon said paper feed ways between said article feed belt and said conveyer ways, a standard secured to the frame of the machine, a reciprocating pusher member traveling across the inner end of said article feed belt and adapted to move the article to be wrapped from said feed belt and to hold it yieldingly against said standard, a plunger reciprocably mounted on said standard and adapted to engage the article to be wrapped to force it against the sheet of paper and to force the article and the sheet of paper between the paper feed ways to position upon the conveyer ways, yielding arms pushed back by said movement of the article, a folder member adapted to engage the rear top flap of the wrapper to fold it forwardly on the article, the front top flap of said wrapper being engaged by said yielding arms, as the article and the wrapper move forward on the conveyer ways, to fold the front top flap rearwardly, a heating plate engaging the top of said article and wrapper, pairs of oppositely rotating end flap folders disposed to engage the top and bottom and rear end flaps of the wrapper to fold them against the article, side heating plates disposed at the sides of said conveyer ways, the rear ends thereof being disposed to engage the front end flaps to fold them rearwardly, and a pair of oppositely disposed delivery belts at the rear end of the machine adapted to engage the ends of the wrapped article to carry it out of the machine, all coacting substantially as described.

2. In a machine of the class described, the combination of conveyer ways, a wrapping conveyer for carrying the articles to be wrapped along on said ways, an article feed belt, paper feed ways, means for delivering a sheet of paper upon said paper feed ways between said article feed belt and said conveyer ways, a standard secured to the frame of the machine, a reciprocating pusher member traveling across the inner end of said article feed belt and adapted to move the article to be wrapped from said feed belt and to hold it yieldingly against said standard, a plunger reciprocably mounted on said standard and adapted to engage the article to be wrapped to force it against the sheet of paper and to force the article and the sheet of paper between the paper feed ways into position on the conveyer ways, yielding arms pushed back by the said movement of the article, a folder member adapted to engage the rear top flap of the wrapper to fold it forwardly on the article, the front top flap of said wrapper being engaged by said yielding arms, as the article and the wrapper move forward on the conveyer ways, to fold the front top flap rearwardly, means engaging the top and bottom and rear end flaps of the wrapper to fold them against the article, means engaging the front end flaps to fold them rearwardly, all coacting substantially as described.

3. In a machine of the class described, the combination of a wrapping conveyer for carrying the articles to be wrapped through the machine, paper feed ways, means for delivering a sheet of paper upon said paper feed ways, means for delivering an article to be wrapped into position adjacent said paper feed ways, a plunger adapted to engage the article to be wrapped to force it against the sheet of paper and to force the article and the sheet of paper between the paper feed ways to the conveyer, a pair of rock shafts journaled above said paper feed ways, a plurality of fingers fixed on said rock shafts and adapted to rest upon the sheet of paper, a second rock shaft, an arm on said second rock shaft adapted to engage the top of said plunger as it approaches the outer limits of its movement, connections between said last named rock shaft and said first named rock shafts whereby the movement of said last named rock shaft is communicated to the said first named rock shafts, and means for folding the top and end flaps of said wrapper upon the article as it is carried along by said wrapping conveyer.

4. In a machine of the class described, the combination of a wrapping conveyer for carrying the articles to be wrapped through the machine, paper feed ways, means for delivering a sheet of paper upon said paper feed ways, means for delivering an article to be wrapped into position adjacent said paper feed ways, a plunger adapted to engage the article to be wrapped to force it against the sheet of paper and to force the article and the sheet of paper between the paper feed ways to the conveyer, a pair of rock shafts journaled above said paper feed ways, a plurality of fingers fixed on said rock shafts and adapted to rest upon the sheet of paper, means for lifting said fingers while the plunger is at the outer limits of its movement, and means for folding the top and end flaps of said wrapper upon the article as it is carried along by said wrapping conveyer.

5. In a machine of the class described, the combination of a wrapping conveyer for carrying the articles to be wrapped through the machine, paper feed ways, means for delivering a sheet of paper upon said paper feed ways, means for delivering an article to be wrapped into position adjacent said paper feed ways, a plunger adapted to engage the article to be wrapped to force it against the sheet of paper and to force the article and the sheet of paper between the paper feed ways to the conveyer, paper retaining members adapted to rest upon the sheet of paper on the paper feed ways, and means for lifting said paper retaining members and holding them in elevated position while the plunger is at the outer limits of its movement.

6. In a machine of the class described, the combination of a wrapping conveyer for carrying the articles to be wrapped through the machine, paper feed ways, means for delivering a sheet of paper upon said paper feed ways, means for delivering an article to be wrapped into position adjacent said paper feed ways, a plunger adapted to engage the article to be wrapped to force it against the sheet of paper and to force the article and the sheet of paper between the paper feed ways to the conveyer, paper retaining members adapted to rest upon the sheet of paper on said paper feed ways, and automatic means actuated by said plunger for lifting said members and holding them in elevated position to permit a sheet of paper to be delivered beneath them.

7. In a machine of the class described, the combination of a wrapping conveyer for carrying the articles to be wrapped through the machine, paper feed ways, means for delivering a sheet of paper upon said paper feed ways, means for delivering an article to be wrapped into position adjacent said paper feed ways, a plunger adapted to engage the article to be wrapped to force it against the sheet of paper and to force the article and the sheet of paper between the paper feed ways to the conveyer, paper retaining members adapted to rest upon the sheet of paper on said paper feed ways, and automatic means for lifting said members and holding them in elevated position to permit a sheet of paper to be delivered beneath them.

8. In a machine of the class described, the combination of a wrapping conveyer for carrying the articles to be wrapped through the machine, paper feed ways, an article feed belt, paper feeding and cutting mechanism, a sheet delivery mechanism for delivering a sheet of paper into position on said paper feed ways, a driven shaft, a gear on said shaft having a driving connection with said paper feeding and cutting mechanism, a clutch means connecting said gear with said shaft, an arm pivoted on the frame, a cam fixed on said shaft and engaging the upper end of said arm to rock the same on its pivot, a link connected to the upper end of said arm with its free end disposed to be brought into position to actuate said clutch means, a bell crank pivoted on the frame and having one arm disposed beneath and supporting said link whereby the rocking of said second bell crank raises and lowers said link to bring it out of and into position to actuate said clutch, a rock shaft, connections from said rock shaft to said bell crank, means actuated by the article to be wrapped as it is carried along on said feed belt for rocking said rock shaft, all coacting substantially as described.

9. In a machine of the class described, the combination of a wrapping conveyer for carrying the articles to be wrapped through the machine, paper feed ways, an article feed belt, a pusher member for moving the article to be wrapped from said feed belt, paper feeding and cutting mechanism, a sheet delivery mechanism for delivering a sheet of paper into position on said paper feed ways, a driven shaft, clutch means connecting said shaft with said paper feeding mechanism, a reciprocably mounted trip member, a cam on said shaft reciprocating said trip member, means actuated by the article to be wrapped as it is carried along on said feed belt for bringing said trip member into position whereby, on the reciprocation thereof, the clutch means is thrown into engagement to drive said paper feeding and cutting mechanism, and means preventing the actuation of said clutch means except when said pusher member is in its inner position.

10. In a machine of the class described, the combination of a wrapping conveyer for carrying the articles to be wrapped through the machine, paper feed ways, an article feed belt, paper feeding and cutting mechanism, a sheet delivery mechanism for delivering a sheet of paper into position on said paper feed ways, driven shaft, clutch means connecting said shaft with said paper feeding mechanism, a reciprocably mounted trip member, a cam on said shaft reciprocating said trip member, means actuated by the article to be wrapped as it is carried along on said feed belt for bringing said trip member into position whereby, on the reciprocation thereof, the clutch means is thrown into engagement to drive said paper feeding and cutting mechanism.

11. In a machine of the class described, the combination of a wrapping conveyer carrying the articles to be wrapped through the machine, paper feed ways, an article feed belt, a reciprocating pusher member for moving the articles to be wrapped from said feed belt, paper feeding and cutting mechanism, a sheet delivery mechanism for delivering a sheet of paper into position on said paper feed ways, a driven shaft, a paper feed clutch means connecting said paper feeding mechanism with said driven shaft, a rock shaft journaled above said article feed belt, a stop member fixed on said rock shaft and adapted to be engaged by the article to be wrapped as it is carried along on said feed belt, an arm on said rock shaft, connections from said arm to said paper feed clutch means for throwing said clutch means into engagement when said shaft is rocked, means preventing the actuation of said rock shaft, and a trip member carried by said pusher member and disposed to engage said means to permit the actuation of said rock shaft when said pusher member is in its inner position.

12. In a machine of the class described, the combination of a wrapping conveyer carrying the articles to be wrapped through the machine, means for folding the flaps of the wrapper upon said article as it is carried along by said conveyer, paper feed ways, means delivering a sheet of paper into position on said paper feed ways, article feed mechanism comprising an article feed belt, pulleys on which said feed belt is disposed, means for driving said pulleys, guide ways disposed on either side of said feed belt, an upright standard disposed on each side of said feed belt, a rearwardly projecting link pivoted on each standard, a roller journaled in the rear ends of said links, a forwardly projecting link pivoted on each standard, a roller journaled in the forward ends of said links, said rollers being adapted to engage the top of the article to be wrapped, driving connections for said rollers whereby they are positively driven in the same direction, a pusher member disposed above said article feed belt, means for reciprocating said pusher member to move the article to be wrapped from said feed belt, means for actuating said plunger to force the article to be wrapped against the sheet of paper and to force the sheet of paper and the article to be wrapped upon the wrapping conveyer.

13. In a machine of the class described, the combination of a wrapping conveyer carrying the articles to be wrapped through the machine, means for folding the flaps of the wrapper upon said article as it is carried along by said conveyer, paper feed ways, means delivering a sheet of paper into position on said paper feed ways, article feed mechanism comprising an article feed belt, pulleys on which said feed belt is disposed, means for driving said pulleys, an upright standard disposed on each side of said feed belt, a rearwardly projecting link pivoted on each standard, a roller journaled in the rear ends of said links, a forwardly projecting link pivoted on each standard, a roller journaled in the forward ends of said links, said rollers being adapted to engage the top of the article to be wrapped, driving connections for said rollers whereby they are positively driven in the same direction, a pusher member disposed above said article feed belt, means for reciprocating said pusher member to move the article to be wrapped from said feed belt, means for actuating said plunger to force the article to be wrapped against the sheet of paper and to force the sheet of paper and the article to be wrapped upon the wrapping conveyer.

14. In a machine of the class described, the combination of a wrapping conveyer carrying the articles to be wrapped through the machine, means for folding the flaps of the wrapper upon said article as it is carried along by said conveyer, paper feed ways above said conveyer, means delivering a sheet of paper into position on said paper feed ways, article feed mechanism comprising an article feed belt adjacent said paper feed ways, pulleys on which said feed belt is disposed, means for driving said pulleys, rollers spaced from said feed belt and adapted to engage the top of the article to be wrapped, driving connections for said rollers whereby they are positively driven in the same direction, a pusher member disposed above said article feed belt, means for reciprocating said pusher member to move the article to be wrapped from said feed belt, onto the sheet of paper, a plunger above said paper feed ways, and means for actuating said plunger to force the article to be wrapped against the sheet of paper and to force the sheet of paper and the article to be wrapped upon the wrapping conveyer.

15. In a machine of the class described, the combination of a frame, a wrapping conveyer carrying the articles to be wrapped through the machine, paper feed ways above said conveyer, paper feeding and cutting mechanism, a plurality of lower shafts journaled in said frame, a plurality of lower rolls mounted on said shafts, the upper edges of said rolls projecting above the feed ways, means for driving said shafts in the same direction, a gear on each shaft, a rod mounted on the frame, a plurality of journal members linked together, certain of said journal members being pivotally mounted on said rod, upper shafts carried by said linked journal members, a plurality of upper rolls carried by said shafts coöperating with the lower rolls to deliver a sheet of paper from said cutting mechanism to said paper feed ways, an article feed belt, means for moving the article to be wrapped from said feed belt to a position above the paper feed ways, and a plunger for forcing the article be wrapped against the sheet of paper delivered upon said paper feed ways and forcing said article and the sheet of paper into position upon the wrapping conveyer.

16. In a machine of the class described, the combination of a wrapping conveyer carrying the articles to be wrapped through the machine, paper feed ways on one side of said conveyer, means delivering a sheet of paper into position on said paper feed ways, article feed means for positioning the article above said conveyer, a plunger delivering the article to be wrapped downwardly upon the sheet of paper forcing said sheet of paper and the article downwardly upon the wrapping conveyer, a shaft journaled below said paper feed ways, a plurality of arms fixed on said shaft and extending beneath the sheet of paper, a top plate disposed above said wrapping conveyer, the rear end thereof extending beneath said shaft and being provided with slots to accommodate said arms, a gear on said shaft, a suitably journaled gear meshing with said gear, an arm fixed on said last named gear, and a spring connected to said arm whereby the arms on said shaft are yieldingly held in horizontal position.

17. In a machine of the class described, the combination of a wrapping conveyer carrying the articles to be wrapped through the machine, paper feed ways above said conveyer, means delivering a sheet of paper into position on said paper feed ways, article feed means for positioning the article above the paper feed ways, a plunger delivering the article to be wrapped against the sheet of paper forcing said sheet of paper and the article into position upon the wrapping conveyer; a shaft journaled adjacent to said paper feed ways, a plurality of arms fixed on said shaft and extending adjacent the sheet of paper, a gear on said shaft, a suitably journaled gear meshing with said gear, an arm fixed on said last named gear, and a spring connected to said arm whereby the arms on said shaft are yieldingly held in the path of the article.

18. In a machine of the class described, the combination of a wrapping conveyer carrying the articles to be wrapped through the machine, paper feed ways above said conveyer, means delivering a sheet of paper into position on said paper feed ways, article feed means for positioning the article above the paper feed ways, a plunger delivering the article to be wrapped against the sheet of paper forcing said sheet of paper and the article into position upon the wrapping conveyer, a shaft journaled adjacent said paper feed ways, a plurality of arms fixed on said shaft and extending adjacent the sheet of paper, and means whereby the arms on said shaft are yieldingly held in the path of the article.

19. In a machine of the class described, the combination of article feed means, paper feed ways, means for delivering a sheet of paper into position on said ways, a wrapping conveyer, upper and lower supports for the upper and lower reaches of said conveyer, a pair of rods carried by said upper and lower supports, a block slidably mounted on said rods, a bolt passing through said block and connected at top and bottom to the upper and lower supports respectively, nuts threaded on said bolt above and below said block, supports carried by said block and adjustable laterally thereon, conveyer ways carried by said supports, and means for forcing the article to be wrapped against said sheet of paper and for forcing said sheet of paper and the article to be wrapped into position upon the conveyer ways.

20. In a machine of the class described, the combination of article feed means, paper feed ways, means for delivering a sheet of paper into position on said paper feed ways, a wrapping conveyer, a shaft journaled in the frame of the machine, means for driving said shaft at a variable speed, a pair of upper end flap folders adjustably mounted on said shaft, a vertically adjustable block, supports carried by said block and laterally adjustable thereon, a stub shaft journaled in each support, a lower end flap folder fixed on each stub shaft, connections from each stub shaft to the first named shaft whereby all the end flap folders are driven at a variable speed, and means for forcing the article to be wrapped against the sheet of paper and for forcing the sheet of paper and the article to be wrapped into position upon said conveyer.

21. In a machine of the class described, the combination of article feed means, paper feed ways, means for delivering a sheet of paper into position on said paper feed ways, a wrapping conveyer, a shaft journaled in the frame of the machine, a pair of upper end flap folders adjustably mounted on said shaft, a vertically adjustable block, supports carried by said block and laterally adjustable thereon, a stub shaft journaled in each support, a lower end flap folder fixed on each stub shaft, connections from each stub shaft to the first named shaft, and means for forcing the article to be wrapped against the sheet of paper and for forcing the sheet of paper and the article to be wrapped into position upon said conveyer.

22. In a machine of the class described, the combination of article feed means, paper feed ways, means for delivering a sheet of paper into position on said feed ways, a wrapping conveyer, a shaft journaled in the frame of the machine, means for driving said shaft at a variable speed, a pair of upper end flap folders adjustably mounted on said shaft, vertically and laterally adjustable supports, a stub shaft journaled in each support, a lower end flap folder fixed on each stub shaft, connections from each stub shaft to the first named shaft whereby all the end flap folders are driven at a variable speed, and means for forcing the article to be wrapped against the sheet of paper and for forcing the sheet of paper and the article to be wrapped into position upon said conveyer.

23. In a machine of the class described, the combination of a conveyer, a shaft journaled in the frame of the machine above said conveyer, a pair of upper end flap folders adjustably mounted on said shaft and extending alongside said conveyer, vertically and laterally adjustable supports mounted on the frame of the machine, a stub shaft journaled in each support, a lower end flap folder fixed on each stub shaft extending alongside said conveyer, and connections from each stub shaft to the first named shaft.

24. In a machine of the class described, the combination of article feed mechanism, paper feed and cutting mechanism, sheet delivery mechanism, a wrapping conveyer for carrying the articles to be wrapped through the machine, a rear conveyer shaft and a front conveyer shaft, a sprocket on each of said shafts over which the conveyer is disposed, a power shaft, a drive shaft connected with said power shaft, a sprocket on said drive shaft, a clutch connecting said sprocket with said drive shaft, connections from said sprocket to the rear conveyer shaft, a cam shaft controlling the wrapping mechanism, connections from said rear conveyer shaft to said cam shaft, a driving connection between said cam shaft and said paper feed mechanism comprising a clutch adapted to be actuated by the article to be wrapped as it is carried along on the article feed belt, connections from said forward conveyer shaft to said article feed mechanism, and connections from said forward conveyer shaft to said sheet delivery mechanism.

25. In a machine of the class described, the combination of article feed mechanism, paper feed and cutting mechanism, sheet delivery mechanism, a wrapping conveyer for carrying the articles to be wrapped through the machine, a rear conveyer shaft and a front conveyer shaft, a sprocket on each of said shafts over which the conveyer is disposed, a power shaft, a drive shaft connected with said power shaft, a sprocket on said drive shaft, a clutch connecting said sprocket with said drive shaft, connections from said sprocket to the rear conveyer shaft, a cam shaft controlling the wrapping mechanism, connections from said rear conveyer shaft to said cam shaft, a driving connection between said cam shaft and said paper feed mechanism, connections from said forward conveyer shaft to said article feed mechanism, and connections from said forward conveyer shaft to said sheet delivery mechanism.

26. In a machine of the class described, the combination of article feed mechanism, paper feed and cutting mechanism, sheet delivery mechanism, a wrapping conveyer for carrying the articles to be wrapped through the machine, a rear conveyer shaft and a front conveyer shaft, a sprocket on each of said shafts over which the conveyer is disposed, a power shaft, a drive shaft connected with said power shaft, connections from said drive shaft to the rear conveyer shaft, wrapping mechanism, a cam shaft controlling the wrapping mechanism, connections from said rear conveyer shaft to said cam shaft, a driving connection between said cam shaft and said paper feed mechanism, connections from said forward conveyer shaft to said article feed mechanism, and connections from said forward conveyer shaft to said sheet delivery mechanism.

27. In a machine of the class described, the combination of paper feed and cutting mechanism, sheet delivery mechanism, a wrapping conveyer for carrying the articles to be wrapped through the machine, a rear conveyer shaft and a front conveyer shaft; a sprocket on each of said shafts over which the conveyer is disposed, a power shaft, a drive shaft connected with said power shaft, connections from said power shaft to the rear conveyer shaft, wrapping mechanism, a cam shaft controlling the wrapping mechanism, connections from said rear conveyer shaft to said cam shaft, a driving connection between said cam shaft and said paper feed mechanism, and connections from said forward conveyer shaft to said sheet delivery mechanism.

28. In a machine of the class described, the combination of paper feed and cutting mechanism, a wrapping conveyer for carrying the articles to be wrapped through the machine, a rear conveyer shaft and a front conveyer shaft, a sprocket on each of said shafts over which the conveyer is disposed, a power shaft, a drive shaft connected with said power shaft, connections from said power shaft to the rear conveyer shaft, wrapping mechanism, a cam shaft controlling the wrapping mechanism, connections from said rear conveyer shaft to said cam shaft, a driving connection between said cam shaft and said paper feed mechanism.

29. In a machine of the class described, the combination of sheet delivery mechanism, a wrapping conveyer for carrying the articles to be wrapped through the machine, a rear conveyer shaft and a front conveyer shaft, a sprocket on each of said shafts over which the conveyer is disposed, a power shaft, a drive shaft connected with said power shaft, connections from said power shaft to the rear conveyer shaft, wrapping mechanism, a cam shaft controlling the wrapping mechanism, connections from said rear conveyer shaft to said cam shaft.

30. In a wrapping machine, the combination of an article feed conveyer, a wrapping conveyer, a reciprocating plunger carrying the articles to be wrapped from said feed conveyer to said wrapping conveyer, a paper feed means comprising paper feed ways disposed between said conveyers one at each side of said plunger so that the plunger reciprocates between them, paper feed rollers coacting with said paper feed ways to carry the paper below the said article feed conveyer and plunger, driving means for said rollers, connected supporting links for said rollers, and supporting rollers arranged in openings in said paper feed ways to support the paper below said rollers.

31. In a wrapping machine, the combination of an article feed conveyer, a wrapping conveyer, a plunger carrying the articles from said feed conveyer to said wrapping conveyer, a paper feed means comprising paper feed ways disposed transversely between said conveyers so that the plunger reciprocates between them, paper feed rolls coacting with said paper feed ways to carry the paper below the said article feed conveyer and plunger, and paper retainers pivotally mounted above the paper feed ways to rest upon the paper as it is drawn downwardly over the edges of said paper feed ways by the downward movement of the plunger, said retainers being supported in an elevated position by the plunger while it is in its initial position and being permitted to drop to engaging position upon the initial movement of the plunger.

32. In a wrapping machine, the combination of a plunger, a paper feed means comprising paper feed ways so that the plunger reciprocates between them, and paper retainers supported to rest upon the paper as it is drawn from said paper feed ways by the feed movement of the plunger, said retainers being supported in inoperative position while the plunger is in its initial position and being permitted to engage upon the initial movement of the plunger.

33. In a wrapping machine, the combination of a plunger, a paper feed means, and paper retainers movably supported to rest upon the paper as it is drawn from said paper feed means by the feed movement of the plunger, said retainers being supported in an inoperative position while the plunger is in its initial position and being permitted to engage upon the initial movement of the plunger.

34. In a wrapping machine, the combination of an article feed conveyer, a wrapping conveyer, a plunger carrying the articles from said feed conveyer to said wrapping conveyer, a paper feed means comprising paper feed ways disposed between said conveyers, so that the plunger reciprocates between them, paper retainers supported to rest upon the paper as it is drawn from said paper feed ways on the feed movement of the plunger, said retainers being supported in an elevated position while the plunger is in its initial position and being permitted to engage the paper upon the initial movement of the plunger, a folder member reciprocating below said paper feed ways to engage the rear side of a sheet delivered from said paper feed ways and fold it forwardly upon the article, a side folder engaging the front side of the sheet and folding it down over the rear side as the article is carried along by the wrapping conveyer, and end folders, all coacting for the purpose specified.

35. In a wrapping machine, the combination of a conveyer, a rotary end folder having a pair of fingers, the front finger being adapted to engage a flap, the rear finger being adapted to engage an adjacent flap and fold it forwardly upon the first flap, and means for driving said conveyer and folder whereby the conveyer is driven at a uniform speed and said folder with variable speed.

36. In a structure of the class described, the combination comprising a wrapping mechanism comprising a conveyer, a feed conveyer independent of said wrapping mechanism conveyer for supplying cartons to said wrapping mechanism, a paper feed mechanism for supplying sheets of paper to said wrapping mechanism in operative position relative to said carton, means for driving said paper feed mechanism, automatic means actuated by the cartons rendering said driving means operative as long as the supply of cartons on said feed conveyer is continuous, and means for automatically rendering said driving means inoperative when the supply of cartons to said feed conveyer is interrupted.

In witness whereof I have hereunto set my hand and seal in the presence of two witnesses.

HARRY L. JOHNSON. [L. S.]

Witnesses:
  C. H. PATTERSON,
  H. G. BAYLEY.